US012408221B2

(12) United States Patent
Torikura et al.

(10) Patent No.: US 12,408,221 B2
(45) Date of Patent: Sep. 2, 2025

(54) COMMUNICATION SYSTEM, COMMUNICATION DEVICE, SERVER AND ACCESS METHOD

(71) Applicant: Roland Corporation, Shizuoka (JP)

(72) Inventors: Hiromi Torikura, Shizuoka (JP); Kiyotaka Hori, Shizuoka (JP); Takuma Yamashita, Shizuoka (JP); Ichiro Yazawa, Shizuoka (JP)

(73) Assignee: Roland Corporation, Shizuoka (JP)

( * ) Notice: Subject to any disclaimer, the term of this patent is extended or adjusted under 35 U.S.C. 154(b) by 192 days.

(21) Appl. No.: 17/961,547

(22) Filed: Oct. 6, 2022

(65) Prior Publication Data

US 2023/0109716 A1   Apr. 13, 2023

(30) Foreign Application Priority Data

Oct. 8, 2021   (JP) .................................. 2021-165931
Dec. 20, 2021   (JP) .................................. 2021-206387
(Continued)

(51) Int. Cl.
*H04W 76/15*   (2018.01)
*G10H 1/00*   (2006.01)
(Continued)

(52) U.S. Cl.
CPC .......... *H04W 76/15* (2018.02); *G10H 1/0083* (2013.01); *H04L 63/083* (2013.01);
(Continued)

(58) Field of Classification Search
CPC ... H04W 76/15; H04W 12/068; H04W 12/08; H04W 12/71; H04W 52/0229;
(Continued)

(56) References Cited

U.S. PATENT DOCUMENTS 5,892,171 A   4/1999   Ide
6,009,457 A * 12/1999   Moller .................... H04L 65/80
                                                                    709/205
(Continued)

FOREIGN PATENT DOCUMENTS

EP   1715437   10/2006
JP   2009180757   8/2009
(Continued)

OTHER PUBLICATIONS

"Office Action of U.S. Related Application, U.S. Appl. No. 17/888,490", issued on Apr. 30, 2024, p. 1-p. 16.
(Continued)

*Primary Examiner* — Aravind K Moorthy
(74) *Attorney, Agent, or Firm* — JCIPRNET

(57) ABSTRACT

A communication system including a communication device, an electronic device, and a server is provided. The communication device includes an authorization information request part transmitting a request for authorization information, an authorization information reception part receiving the authorization information, a first data request information reception part receiving data request information, a data request information transmission part transmitting the received data request information, a data reception part receiving data, and a first data transmission part transmitting the received data. The server includes an identifier storage part storing the device identifier, an authorization information request reception part receiving the request for the authorization information, an authorization information creation part acquiring a user identifier and creating the authorization information, a first authorization information transmission part transmitting the created authorization information, a second data request information reception
(Continued)

part receiving the data request information, and a second data transmission part transmitting the data.

20 Claims, 18 Drawing Sheets

(30) Foreign Application Priority Data

Dec. 20, 2021 (JP) .................. 2021-206390
Dec. 20, 2021 (JP) .................. 2021-206391
Dec. 20, 2021 (JP) .................. 2021-206395

(51) Int. Cl.
| | |
|---|---|
| *H04L 9/40* | (2022.01) |
| *H04L 67/02* | (2022.01) |
| *H04W 12/06* | (2021.01) |
| *H04W 12/08* | (2021.01) |
| *H04W 12/71* | (2021.01) |
| *H04W 52/02* | (2009.01) |
| *H04W 76/10* | (2018.01) |
| *H04W 84/12* | (2009.01) |

(52) U.S. Cl.
CPC .......... *H04L 63/0892* (2013.01); *H04L 67/02* (2013.01); *H04W 12/068* (2021.01); *H04W 12/08* (2013.01); *H04W 12/71* (2021.01); *H04W 52/0229* (2013.01); *H04W 52/0254* (2013.01); *H04W 76/10* (2018.02); *H04W 84/12* (2013.01)

(58) Field of Classification Search
CPC . H04W 52/0254; H04W 76/10; H04W 84/12; H04W 84/18; H04W 88/04; H04W 76/14; G10H 1/0083; G10H 2240/105; G10H 2240/111; G10H 2240/211; G10H 2240/305; G10H 2240/321; G10H 1/0058; H04L 63/083; H04L 63/0892; H04L 67/02
See application file for complete search history.

(56) References Cited

U.S. PATENT DOCUMENTS

| | | | | |
|---|---|---|---|---|
| 6,415,439 B1* | 7/2002 | Randell | ............... | H04L 65/1101 725/74 |
| 7,456,352 B1 | 11/2008 | Hasegawa et al. | | |
| 7,515,901 B1* | 4/2009 | Kaundinya | ......... | H04W 12/065 380/247 |
| 7,843,821 B2* | 11/2010 | Kunhappan | ........... | H04L 69/324 703/23 |
| 7,944,577 B2 | 5/2011 | Chang et al. | | |
| 8,028,323 B2 | 9/2011 | Weel | | |
| 8,214,873 B2 | 7/2012 | Weel | | |
| 8,305,928 B2* | 11/2012 | Carter | ..................... | H04L 12/66 370/254 |
| 8,314,319 B2 | 11/2012 | Yokoyama et al. | | |
| 8,340,292 B1* | 12/2012 | Schnellbacher | ...... | H04L 63/306 726/4 |
| 8,397,280 B1* | 3/2013 | Zhu | ..................... | H04W 12/069 726/4 |
| 8,443,063 B1* | 5/2013 | Nelson | ................. | H04W 48/00 709/228 |
| 8,510,804 B1* | 8/2013 | Bonn | ..................... | H04L 69/22 709/224 |
| 8,671,195 B2 | 3/2014 | Rothschild | | |
| 8,775,810 B1* | 7/2014 | Snodgrass | ................. | H04L 9/08 713/175 |
| 9,253,692 B1* | 2/2016 | Shah | ................. | H04W 36/0072 |
| 9,300,723 B2 | 3/2016 | Rothschild | | |
| 9,397,980 B1* | 7/2016 | Chen | ...................... | G06F 21/33 |
| 9,516,370 B1 | 12/2016 | Weel | | |
| 9,554,405 B2 | 1/2017 | Weel | | |
| 9,560,047 B1* | 1/2017 | Long | ..................... | H04W 12/08 |
| 9,780,950 B1* | 10/2017 | Dundas | ..................... | H04L 9/08 |
| 9,792,782 B1* | 10/2017 | Basu | ..................... | G07F 19/203 |
| 9,898,588 B2* | 2/2018 | Seleznev | ................ | G06F 21/10 |
| 9,928,839 B1* | 3/2018 | Lester | ................ | H04L 63/0861 |
| 9,965,233 B2 | 5/2018 | Chang et al. | | |
| 9,967,248 B1* | 5/2018 | Cheng | ................ | H04L 63/0876 |
| 10,038,778 B1 | 7/2018 | Bhattacharyya et al. | | |
| 10,123,223 B1* | 11/2018 | Ford | ..................... | H04W 24/08 |
| 10,140,073 B2 | 11/2018 | Chang et al. | | |
| 10,164,957 B1* | 12/2018 | Saylor | ................... | H04W 12/61 |
| 10,403,252 B2 | 9/2019 | Chapman et al. | | |
| 10,541,996 B1* | 1/2020 | Choi | ..................... | H04L 63/083 |
| 10,552,823 B1* | 2/2020 | Woodward | ........... | G06Q 20/322 |
| 10,925,118 B1* | 2/2021 | Lin | ....................... | G06F 16/50 |
| 11,051,163 B1* | 6/2021 | Smith | .................... | H04W 12/06 |
| 11,063,762 B1* | 7/2021 | Makarskyy | ............. | G06F 9/547 |
| 11,171,964 B1* | 11/2021 | Huang | .................... | G06F 21/33 |
| 11,238,683 B1* | 2/2022 | Mars | ..................... | H04W 12/084 |
| 11,392,664 B1* | 7/2022 | Merritt | ................. | G06F 16/9535 |
| 11,397,947 B2* | 7/2022 | Chitalia | ............... | G06Q 20/326 |
| 11,580,548 B2* | 2/2023 | Ranganathan | ...... | H04L 63/0876 |
| 11,615,199 B1* | 3/2023 | Poder | .................... | G06F 21/6218 726/6 |
| 11,689,918 B2* | 6/2023 | Sethi | .................... | H04W 12/041 726/6 |
| 11,749,031 B1 | 9/2023 | Rusu | | |
| 11,842,328 B2* | 12/2023 | Mehrhoff | ............. | G06F 16/252 |
| 11,893,996 B1* | 2/2024 | Kockerbeck | ........... | G10L 15/34 |
| 11,966,656 B2 | 4/2024 | Miyama et al. | | |
| 12,192,183 B1* | 1/2025 | Kerr | ....................... | H04L 12/66 |
| 2002/0007719 A1* | 1/2002 | Hasegawa | .......... | G06Q 30/0273 84/609 |
| 2003/0024376 A1* | 2/2003 | Gyoten | ..................... | G10H 1/24 84/609 |
| 2003/0061115 A1 | 3/2003 | Wachi | | |
| 2003/0131719 A1 | 7/2003 | Kubita | | |
| 2005/0044016 A1 | 2/2005 | Irwin et al. | | |
| 2005/0079859 A1* | 4/2005 | Eakin | ..................... | H04L 69/329 455/410 |
| 2005/0114896 A1 | 5/2005 | Hug et al. | | |
| 2005/0204902 A1* | 9/2005 | Shibukawa | .......... | G10H 1/0058 84/645 |
| 2005/0273399 A1 | 12/2005 | Soma et al. | | |
| 2006/0124735 A1 | 6/2006 | Mizuno et al. | | |
| 2007/0017344 A1* | 1/2007 | Stoneback | ............... | G10H 5/14 84/600 |
| 2007/0147615 A1* | 6/2007 | Chou | ..................... | H04L 63/10 380/270 |
| 2007/0180496 A1 | 8/2007 | Fransdonk | | |
| 2007/0226293 A1 | 9/2007 | Sakurada et al. | | |
| 2008/0098461 A1* | 4/2008 | Chiou | ..................... | G06F 21/85 713/182 |
| 2008/0109362 A1 | 5/2008 | Fransdonk | | |
| 2008/0307237 A1 | 12/2008 | Holtzman et al. | | |
| 2009/0007240 A1 | 1/2009 | Vantalon et al. | | |
| 2009/0019992 A1* | 1/2009 | Mizuhiki | ................ | G10H 7/002 84/604 |
| 2009/0019993 A1 | 1/2009 | Mizuhiki et al. | | |
| 2009/0089866 A1* | 4/2009 | Yato | ..................... | G06F 21/6218 726/2 |
| 2009/0219888 A1* | 9/2009 | Chen | ..................... | H04W 64/00 370/331 |
| 2010/0077907 A1 | 4/2010 | Tanaka et al. | | |
| 2010/0251352 A1* | 9/2010 | Zarchy | ..................... | G06F 21/10 726/9 |
| 2010/0325040 A1* | 12/2010 | Etchegoyen | ............ | G06F 21/73 705/39 |
| 2011/0099612 A1* | 4/2011 | Lee | ......................... | H04L 51/48 726/6 |
| 2011/0290098 A1 | 12/2011 | Thuillier | | |
| 2012/0030737 A1* | 2/2012 | Pagan | ..................... | G06F 21/44 726/5 |
| 2012/0077432 A1* | 3/2012 | Rose | ..................... | H04W 12/47 455/41.1 |

(56) References Cited

U.S. PATENT DOCUMENTS

| | | | |
|---|---|---|---|
| 2013/0074168 A1* | 3/2013 | Hao | G06F 21/33 726/7 |
| 2013/0097682 A1* | 4/2013 | Zeljkovic | H04L 9/3234 726/7 |
| 2013/0159195 A1* | 6/2013 | Kirillin | H04L 63/105 705/71 |
| 2013/0227661 A1* | 8/2013 | Gupta | H04L 9/321 726/6 |
| 2013/0325854 A1 | 12/2013 | Umeda | |
| 2013/0331027 A1* | 12/2013 | Rose | H04W 12/069 455/41.1 |
| 2014/0047257 A1 | 2/2014 | Masson et al. | |
| 2014/0068738 A1 | 3/2014 | Harty et al. | |
| 2014/0214189 A1 | 7/2014 | Goodwin et al. | |
| 2015/0040744 A1 | 2/2015 | Redding et al. | |
| 2015/0140960 A1* | 5/2015 | Powell | H04M 15/755 455/406 |
| 2015/0141143 A1 | 5/2015 | Gordon et al. | |
| 2015/0143978 A1 | 5/2015 | Oh et al. | |
| 2015/0206521 A1 | 7/2015 | Sexton et al. | |
| 2015/0304434 A1* | 10/2015 | Matsumoto | H04L 67/51 709/204 |
| 2015/0312038 A1* | 10/2015 | Palanisamy | G06Q 20/385 713/155 |
| 2015/0334548 A1 | 11/2015 | Liu et al. | |
| 2015/0350208 A1* | 12/2015 | Bayramkul | G06F 21/35 726/9 |
| 2015/0350362 A1* | 12/2015 | Pollack | H04L 67/566 709/217 |
| 2016/0026702 A1 | 1/2016 | McGregor et al. | |
| 2016/0062623 A1* | 3/2016 | Howard | G06F 3/0488 715/788 |
| 2016/0072797 A1 | 3/2016 | Wilson et al. | |
| 2016/0073264 A1 | 3/2016 | Van den Broeck et al. | |
| 2016/0125862 A1 | 5/2016 | Takahashi | |
| 2016/0134599 A1* | 5/2016 | Ross | H04L 63/0815 713/168 |
| 2016/0140440 A1 | 5/2016 | Hsueh et al. | |
| 2016/0140943 A1* | 5/2016 | Valladares-Madrid | G10H 1/0066 84/645 |
| 2016/0150263 A1* | 5/2016 | Patino | H04N 21/6156 725/81 |
| 2016/0156419 A1* | 6/2016 | Druml | H04W 12/50 398/40 |
| 2016/0196220 A1 | 7/2016 | Perez et al. | |
| 2016/0239842 A1* | 8/2016 | Cash | G06Q 20/3821 |
| 2016/0241402 A1* | 8/2016 | Gordon | H04L 63/0861 |
| 2016/0294556 A1* | 10/2016 | Vortriede | H04L 9/321 |
| 2016/0308862 A1* | 10/2016 | Rolfe | H04L 9/3231 |
| 2016/0342428 A1 | 11/2016 | Hulbert et al. | |
| 2016/0360045 A1 | 12/2016 | Doyle, Sr. et al. | |
| 2016/0366373 A1 | 12/2016 | Siminoff et al. | |
| 2017/0026187 A1* | 1/2017 | Ramatchandirane | G06F 21/6218 |
| 2017/0032374 A1* | 2/2017 | Doddamani | G06Q 20/4016 |
| 2017/0047057 A1 | 2/2017 | Kim et al. | |
| 2017/0085568 A1* | 3/2017 | Rolfe | H04L 63/0884 |
| 2017/0111346 A1 | 4/2017 | Tung | |
| 2017/0126668 A1* | 5/2017 | Mahiddini | H04L 63/0838 |
| 2017/0201550 A1* | 7/2017 | Benson | H04L 63/0815 |
| 2017/0213203 A1 | 7/2017 | Tsutumi | |
| 2017/0236113 A1* | 8/2017 | Chitalia | G01S 19/13 705/44 |
| 2017/0242996 A1 | 8/2017 | Kang et al. | |
| 2017/0301205 A1* | 10/2017 | Blaser | H04W 48/02 |
| 2017/0302656 A1* | 10/2017 | Ramatchandirane | H04L 63/0869 |
| 2017/0337549 A1* | 11/2017 | Wong | G06Q 20/3821 |
| 2017/0345009 A1* | 11/2017 | Unnerstall | G06Q 20/407 |
| 2017/0346581 A1* | 11/2017 | Leopardi | G10H 1/0083 |
| 2018/0007060 A1* | 1/2018 | Leblang | H04L 63/107 |
| 2018/0146081 A1 | 5/2018 | Brenner et al. | |
| 2018/0176223 A1* | 6/2018 | Hutchinson | H04L 9/16 |
| 2018/0233119 A1 | 8/2018 | Patti et al. | |
| 2018/0255456 A1* | 9/2018 | Yin | H04L 63/0823 |
| 2018/0299220 A1* | 10/2018 | Du | F42C 15/40 |
| 2018/0330368 A1* | 11/2018 | Slupesky | H04L 67/02 |
| 2019/0028891 A1* | 1/2019 | Suwirya | H04W 12/06 |
| 2019/0129372 A1 | 5/2019 | Shogaki et al. | |
| 2019/0172045 A1* | 6/2019 | Dunjic | G06Q 20/3224 |
| 2019/0188707 A1* | 6/2019 | Arora | G06Q 20/3224 |
| 2019/0235880 A1 | 8/2019 | Wu et al. | |
| 2019/0268768 A1* | 8/2019 | Iyer | H04W 8/005 |
| 2019/0327223 A1* | 10/2019 | Kumar | H04L 63/0853 |
| 2019/0386981 A1* | 12/2019 | Ramesh Kumar | H04L 9/3228 |
| 2019/0387051 A1* | 12/2019 | Chen | H04L 67/63 |
| 2019/0394174 A1* | 12/2019 | Sillankorva | H04L 9/0643 |
| 2019/0394278 A1 | 12/2019 | Fujimoto et al. | |
| 2020/0023812 A1* | 1/2020 | Hassani | H04L 67/306 |
| 2020/0092271 A1* | 3/2020 | Kumar | G06F 9/45533 |
| 2020/0097937 A1* | 3/2020 | Dunjic | G06Q 20/40 |
| 2020/0205206 A1 | 6/2020 | Proschowsky | |
| 2020/0235911 A1* | 7/2020 | Safak | H04L 9/3247 |
| 2020/0372495 A1* | 11/2020 | Maheshwari | G06Q 20/3678 |
| 2020/0409726 A1 | 12/2020 | Kang | |
| 2020/0412556 A1* | 12/2020 | Yoon | H04L 63/0876 |
| 2020/0413150 A1 | 12/2020 | Kang | |
| 2021/0034546 A1* | 2/2021 | Li | G06F 13/1668 |
| 2021/0035390 A1 | 2/2021 | Determann et al. | |
| 2021/0044976 A1* | 2/2021 | Avetisov | H04W 12/08 |
| 2021/0058392 A1* | 2/2021 | Leddy, III | G06Q 20/388 |
| 2021/0064730 A1* | 3/2021 | Schrag | H04L 67/04 |
| 2021/0110004 A1 | 4/2021 | Ross et al. | |
| 2021/0112577 A1* | 4/2021 | Johnson | H04L 67/60 |
| 2021/0125164 A1* | 4/2021 | Mehrhoff | G06Q 20/341 |
| 2021/0176059 A1* | 6/2021 | Hertrich | H04L 9/3271 |
| 2021/0250765 A1* | 8/2021 | Vargas | H04W 12/71 |
| 2021/0258308 A1* | 8/2021 | Avetisov | H04L 9/0825 |
| 2021/0264015 A1* | 8/2021 | Akinaga | G06F 21/44 |
| 2021/0306461 A1* | 9/2021 | Scott | H04W 12/06 |
| 2021/0336787 A1* | 10/2021 | Patel | H04L 9/3213 |
| 2021/0349969 A1 | 11/2021 | Miyama | |
| 2021/0377361 A1* | 12/2021 | Rajani | H04W 12/068 |
| 2021/0392136 A1* | 12/2021 | Modi | H04L 9/3234 |
| 2022/0027500 A1* | 1/2022 | Summers | G06F 21/43 |
| 2022/0029973 A1* | 1/2022 | Carney | H04L 61/5007 |
| 2022/0070074 A1* | 3/2022 | Kodama | H04L 43/08 |
| 2022/0075747 A1* | 3/2022 | Shuler | G06F 13/4022 |
| 2022/0103563 A1* | 3/2022 | Schuberth | H04L 63/0853 |
| 2022/0229915 A1* | 7/2022 | Sethi | G06F 21/40 |
| 2022/0232084 A1* | 7/2022 | Shetty | H04W 12/71 |
| 2022/0232108 A1* | 7/2022 | Turner | H04L 69/08 |
| 2022/0239269 A1 | 7/2022 | Min et al. | |
| 2022/0255929 A1* | 8/2022 | Rafferty | H04L 63/107 |
| 2022/0261470 A1* | 8/2022 | Zhong | G06F 21/36 |
| 2022/0279351 A1* | 9/2022 | Blasi | H04W 12/71 |
| 2022/0350765 A1* | 11/2022 | Ballard | H04L 9/085 |
| 2022/0351156 A1* | 11/2022 | Ghorbani | G06Q 20/02 |
| 2022/0358494 A1* | 11/2022 | Ramadhane | H04L 63/0846 |
| 2023/0020703 A1* | 1/2023 | Padinjaruveetil | H04L 9/3226 |
| 2023/0143525 A1 | 5/2023 | Nagata | |
| 2023/0155952 A1* | 5/2023 | Ishikura | H04W 28/0268 370/235 |
| 2023/0326438 A1 | 10/2023 | Sumi et al. | |

FOREIGN PATENT DOCUMENTS

| | | |
|---|---|---|
| JP | 2018004744 | 1/2018 |
| JP | 2020082550 | 6/2020 |
| JP | 2021177219 | 11/2021 |
| WO | 2004017664 | 2/2004 |
| WO | WO-2023022719 A1 * | 2/2023 |

OTHER PUBLICATIONS

"Office Action of U.S. Related Application, U.S. Appl. No. 17/970,588", issued on Jun. 23, 2023, p. 1-p. 17.

"Office Action of U.S. Related Application, U.S. Appl. No. 17/888,493", issued on Jun. 30, 2023, p. 1-p. 15.

(56) References Cited

OTHER PUBLICATIONS

"Office Action of Related U.S. Appl. No. 17/970,588", issued on Sep. 26, 2024, pp. 1-23.
"Office Action of Related U.S. Appl. No. 17/964,922", issued on Sep. 20, 2024, pp. 1-51.
"Office Action of U.S. Related Application, U.S. Appl. No. 17/970,588", issued on May 23, 2024, p. 1-p. 14.
"Office Action of U.S. Related Application, U.S. Appl. No. 17/970,588", issued on Dec. 26, 2023, p. 1-p. 20.
"Advisory Action of Related U.S. Appl. No. 17/970,588", issued on Mar. 6, 2024, pp. 1-5.
"Office Action of U.S. Related Application, U.S. Appl. No. 17/888,490", issued on Jul. 16, 2024, p. 1-p. 19.
"Office Action of U.S. Related Application, U.S. Appl. No. 18/583,870", issued on Sep. 26, 2024, p. 1-p. 33.
"Office Action of Related U.S. Appl. No. 17/888,490", issued on Dec. 10, 2024, pp. 1-35.
"Office Action of Related U.S. Appl. No. 18/583,870", issued on Mar. 6, 2025, pp. 1-23.
"Office Action of Related U.S. Appl. No. 17/888,490", issued on Mar. 11, 2025, pp. 1-11.
"Office Action of U.S. Appl. No. 17/964,922", issued on Apr. 17, 2025, pp. 1-42.
"Advisory Action of U.S. Appl. No. 17/888,490", issued on May 14, 2025, pp. 1-2.
"Office Action of U.S. Appl. No. 18/583,870", issued on Jun. 12, 2025, pp. 1-20.
"Office Action of U.S. Appl. No. 17/888,490", issued on Jun. 13, 2025, pp. 1-20.
"Office Action of U.S. Related Application, U.S. Appl. No. 17/961,555", issued on Jun. 27, 2025, p. 1-p. 76.

\* cited by examiner

User DB 72b

| No. | Account | Password | User identifier |
|---|---|---|---|
| 1 | ABC@PPP.com | ******** | AAAA |
| 2 | DEF@PPP.com | ******** | AAAB |
| : | : | : | : |

FIG. 7A

Device DB 72c

| NO. | Device identifier | Product information | User identifier |
|---|---|---|---|
| 1 | 0001 | p0001 | AAAA |
| 2 | 0002 | p0002 | AAAB |
| : | : | : | : |
| 100 | 0100 | – | – |
| : | : | : | : |

FIG. 7B

COMMUNICATION SYSTEM, COMMUNICATION DEVICE, SERVER AND ACCESS METHOD

CROSS-REFERENCE TO RELATED APPLICATIONS

This application claims the priority benefit of Japanese Patent Application No. 2021-165931, filed on Oct. 8, 2021, Japanese Patent Application No. 2021-206387, filed on Dec. 20, 2021, Japanese Patent Application No. 2021-206390, filed on Dec. 20, 2021, Japanese Patent Application No. 2021-206391, filed on Dec. 20, 2021, and Japanese Patent Application No. 2021-206395, filed on Dec. 20, 2021. The entirety of the above-mentioned patent application is hereby incorporated by reference herein and made a part of this specification.

BACKGROUND

Technical Field

The disclosure relates to a communication system, a communication device, a server, and an access method.

Related Art

Patent Document 1 discloses a data utilization system S in which sound data stored on a server 10 is transmitted to an electronic musical instrument 50 via a personal computer (PC) 30 and a recording medium 45, and the transmitted sound data is utilized by the electronic musical instrument 50. In the electronic musical instrument 50, since not only sound data pre-built therein but also the sound data acquired from the server 10 can be utilized, these sound data enable an expressive performance.

Patent Document 1: Japanese Patent Laid-open No. 2021-177219

However, in Patent Document 1, the use of the sound data on the server 10 by the electronic musical instrument 50 must be through the recording medium 45. Specifically, it is necessary to first store the sound data of the server 10 in the PC 30, then store the stored sound data in the recording medium 45 connected to the PC 30, then remove the recording medium 45 from the PC 30 and connect it to the electronic musical instrument 50, and further store the sound data in the recording medium 45 in the electronic musical instrument 50. Accordingly, there is a problem that significant effort and time are required for a user to utilize the sound data of the server 10 by the electronic musical instrument 50.

SUMMARY

The disclosure provides a communication system, a communication device, a server, and an access method in which data on a server can be easily utilized.

A communication system of the disclosure is a system including a communication device; an electronic device to which the communication device is connected; and a server configured to be able to communicate with the communication device and storing data utilized by the electronic device. The communication device includes: an authorization information request part, transmitting to the server a request for authorization information for accessing the server together with a device identifier being an identifier set for each of the communication device; an authorization information reception part, receiving from the server the authorization information according to the request transmitted by the authorization information request part; a first data request information reception part, receiving from the electronic device data request information that requests predetermined data to the server; a data request information transmission part, transmitting to the server the data request information received by the first data request information reception part by using the authorization information received by the authorization information reception part; a data reception part, receiving from the server data according to the data request information transmitted by the data request information transmission part; and a first data transmission part, transmitting to the electronic device the data received by the data reception part. The server includes: an identifier storage part, storing the device identifier in association with a user identifier being an identifier for each user who uses the communication device corresponding to the device identifier; an authorization information request reception part, receiving from the communication device the request for the authorization information together with the device identifier of the communication device; an authorization information creation part, acquiring from the identifier storage part the user identifier corresponding to the device identifier received by the authorization information request reception part, and creating the authorization information according to a user corresponding to the acquired user identifier; a first authorization information transmission part, transmitting the authorization information created by the authorization information creation part to the communication device; a second data request information reception part, receiving the data request information from the communication device; and a second data transmission part, transmitting to the communication device the data according to the data request information received by the second data request information reception part.

A communication device of the disclosure is connected to an electronic device and able to communicate with a server that stores data utilized by the electronic device. The communication device includes: an authorization information request part, transmitting to the server a request for authorization information for accessing the server together with a device identifier being an identifier set for each of the communication device; an authorization information reception part, receiving from the server the authorization information according to the request transmitted by the authorization information request part; a first data request information reception part, receiving from the electronic device data request information that requests predetermined data to the server; a data request information transmission part, transmitting to the server the data request information received by the first data request information reception part by using the authorization information received by the authorization information reception part; a data reception part, receiving from the server data according to the data request information transmitted by the data request information transmission part; and a first data transmission part, transmitting to the electronic device the data received by the data reception part.

A server of the disclosure is configured to be able to communicate with a communication device. The server includes: an identifier storage part, storing a device identifier being an identifier set for each of the communication device in association with a user identifier being an identifier for each user who uses the communication device corresponding to the device identifier; an authorization information request reception part, receiving from the communication device a request for authorization information together with the device identifier of the communication device; an authorization information creation part, acquiring from the identifier storage part the user identifier corresponding to the device identifier received by the authorization information request reception part, and creating the authorization information according to a user corresponding to the acquired user identifier; a first authorization information transmission part, transmitting the authorization information created by the authorization information creation part to the communication device; a second data request information reception part, receiving from the communication device data request information that requests predetermined data; and a second data transmission part, transmitting to the communication device data according to the data request information received by the second data request information reception part.

An access method of the disclosure is a method for accessing data stored on a server from an electronic device connected to the server. The access method includes the following. A device identifier being an identifier set for each of the electronic device is stored on the server in association with a user identifier being an identifier for each user who uses the electronic device corresponding to the device identifier. The electronic device and the server are communicably connected with each other. In the electronic device, a request for authorization information for accessing the server is transmitted to the server together with the device identifier. In the server, the user identifier corresponding to the device identifier received from the electronic device together with the request for the authorization information is acquired from the stored user identifier, and the authorization information according to a user corresponding to the acquired user identifier is created. The created authorization information is transmitted to the electronic device. In the electronic device, data request information that requests predetermined data to the server is transmitted to the server by using the authorization information requested to and received from the server. In the server, data according to the data request information received from the electronic device is transmitted to the electronic device. In the electronic device, the data according to the transmitted data request information is received from the server.

BRIEF DESCRIPTION OF THE DRAWINGS

FIG. 7A schematically illustrates a user database (DB), and FIG. 7B schematically illustrates a device DB.

DESCRIPTION OF THE EMBODIMENTS

Figure 1A:
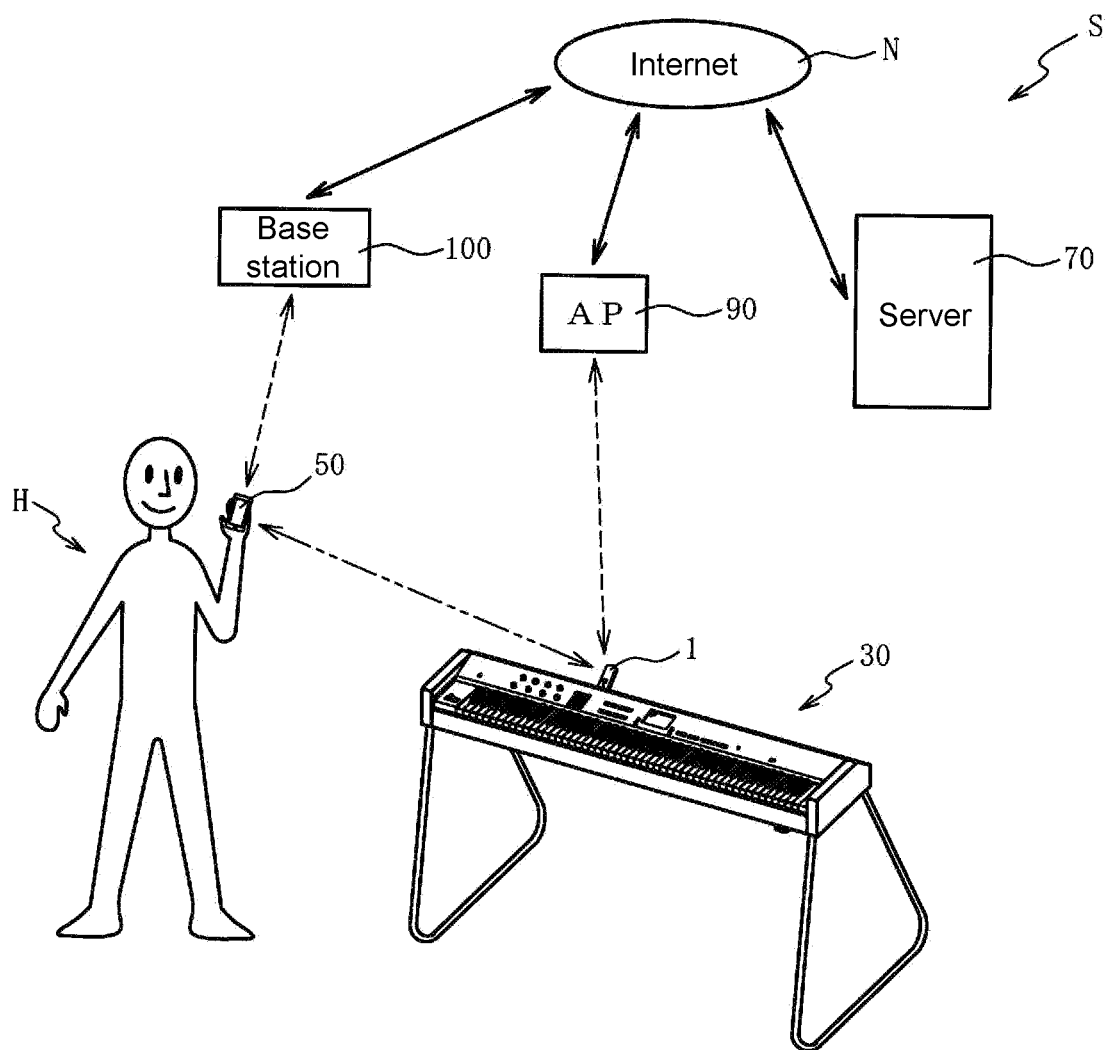
FIG. 1A illustrates an outline of a communication system.
Figure 1B:
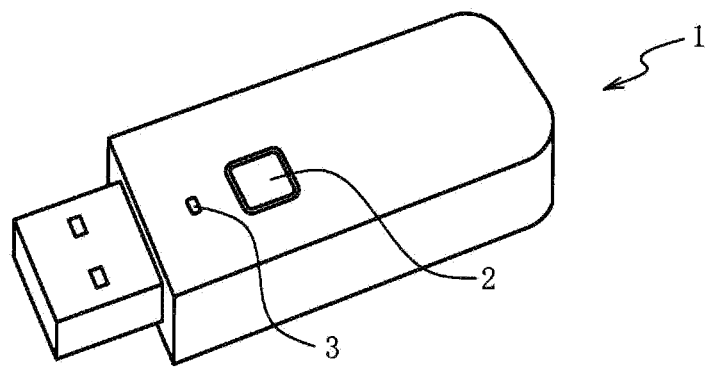
FIG. 1B illustrates an appearance of a communication device.

Hereinafter, embodiments will be described with reference to the accompanying drawings. An outline of a communication system S of the present embodiment is described with reference to FIG. 1A and FIG. 1B. FIG. 1A illustrates the outline of the communication system S, and FIG. 1B illustrates an appearance of a communication device 1. As shown in FIG. 1A, the communication system S includes an electronic musical instrument 30, a mobile terminal 50, and a server 70. The electronic musical instrument 30 is connected to an access point (AP) 90 by wireless communication by Wi-Fi®, and is connected to the Internet N from the AP 90. The mobile terminal 50 is connected to a base station 100, and is connected to the Internet N from the base station 100. Since the server 70 is also connected to the Internet N, the electronic musical instrument 30 and the server 70 as well as the mobile terminal 50 and the server 70 are configured to be mutually communicable via the Internet N. Accordingly, information can be exchanged between the electronic musical instrument 30 and the mobile terminal 50 via the server 70. The mobile terminal 50 may include a mobile smart phone (such as, but not limited to an iPhone™, an Android™ phone, or the like) or other wireless mobile communication devices with suitable processing and encryption capabilities. Typical modern mobile communication devices include network communication electronics, WiFi communication electronics, Bluetooth communication electronics, processor electronics, one or more display devices and a keypad and/or other user input device. In further examples, the mobile terminal 50 may include any suitable type of mobile phone and/or other type of portable electronic communication device, such as, but not limited to, an electronic smart pad device (such as, but not limited to an iPad™), a portable computer, or the like. In some examples described herein, the described functions of the communication device 1, the electronic musical instrument device 30, the mobile terminal 50 and the server 70 can be implemented in hardware, software, firmware, or any combination thereof. If implemented in software, the functions can be stored as one or more instructions or code on a non-transitory computer-readable storage medium or non-transitory processor-readable storage medium. The steps of a method or algorithm disclosed herein can be embodied in a processor-executable software module which can reside on a non-transitory computer-readable or processor-readable storage medium. Non-transitory computer-readable or processor-readable storage media can be any storage media that can be accessed by a computer or a processor. By way of example but not limitation, such non-transitory computer-readable or processor-readable storage media can include RAM, ROM, EEPROM, FLASH memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm can reside as one or any combination or set of codes and/or instructions on a non-transitory processor-readable storage medium and/or computer-readable storage medium, which can be incorporated into a computer program product.

The electronic musical instrument 30 is a device (electronic device) that produces a musical tone based on a performance of a user H. The electronic musical instrument 30 is provided with timbre data having information about timbre, and a timbre according to selection of the user H is acquired from the timbre data and output as a musical tone. The timbre data may be built in the electronic musical instrument 30 at the time of factory shipment, and may also be acquired from the server 70 via the Internet N. Next, communication by the electronic musical instrument 30 like this with an external device such as the server 70 is described.

The communication device 1 is mounted on (connected to) the electronic musical instrument 30. The communication device 1 is a device that communicates with the external device by Wi-Fi or Bluetooth®, and is detachably connected to the electronic musical instrument 30 via USB®. The data input from the electronic musical instrument 30 to the communication device 1 via USB is transmitted to the external device via Wi-Fi or Bluetooth. On the other hand, the data received by the communication device 1 from the external device via Wi-Fi or Bluetooth is input to the electronic musical instrument 30 via USB. As shown in FIG. 1B, the communication device 1 is provided with an operation button 2 for inputting an instruction from the user H, and an LED 3. An operation state of the communication device 1 is notified to the user H by a lighting state or blinking state of the LED 3.

The communication device 1 is connected to the AP 90 by communication by Wi-Fi, and is connected to the Internet N via the AP 90. Since the server 70 is connected to the Internet N, the electronic musical instrument 30 is able to communicate with the server 70 via the communication device 1.

The mobile terminal 50 is a terminal (information processing device, computer) that performs processing according to the instruction input from the user H. The mobile terminal 50 is configured to be able to acquire the timbre data from the server 70 to the electronic musical instrument 30 in response to the instruction from the user H, and details thereof will be described later. In the mobile terminal 50, the timbre data stored on the server 70 can be acquired via the Internet N and be utilized.

The server 70 is an information processing device storing the timbre data or the like utilized by the electronic musical instrument 30 or the mobile terminal 50. The server 70 stores, in addition to the timbre data, musical score data or audio data or the like utilized by the electronic musical instrument 30 or the mobile terminal 50. Hereinafter, data such as the timbre data stored on the server 70 that can be utilized by the electronic musical instrument 30 or the mobile terminal 50 is referred to as a "resource". In the following, timbre data will be mainly described as an example of a resource. However, other types of resources such as musical score data are also the same, and detailed description thereof will be omitted.

When connecting the communication device 1 to the AP 90, it is necessary to set information about the AP 90 to be connected and a password for connecting to the AP 90 in the communication device 1. Since the communication device 1 and the electronic musical instrument 30 to which the communication device 1 is connected are only provided with a display device having the minimum necessary display capability or input capability, it is difficult for the user H to input the information about the AP 90 and or the password of the AP 90 by the communication device 1 and the electronic musical instrument 30.

In the present embodiment, in the mobile terminal 50, a list of APs 90 searched by the communication device 1 is displayed, the user H selects one AP 90 from the displayed list and inputs the password for connecting to the AP 90. The information about the selected AP 90 and the input password are transmitted to the communication device 1, and the communication device 1 performs connection to the AP 90 by using the received information about the AP 90 and the received password of the AP 90. Accordingly, since there is no need for the user H to input the information about the AP 90 or the password of the AP 90 by the communication device 1 and the electronic musical instrument 30, time and effort in connecting the communication device 1 and the electronic musical instrument 30 to the AP 90 can be reduced.

Figure 2:
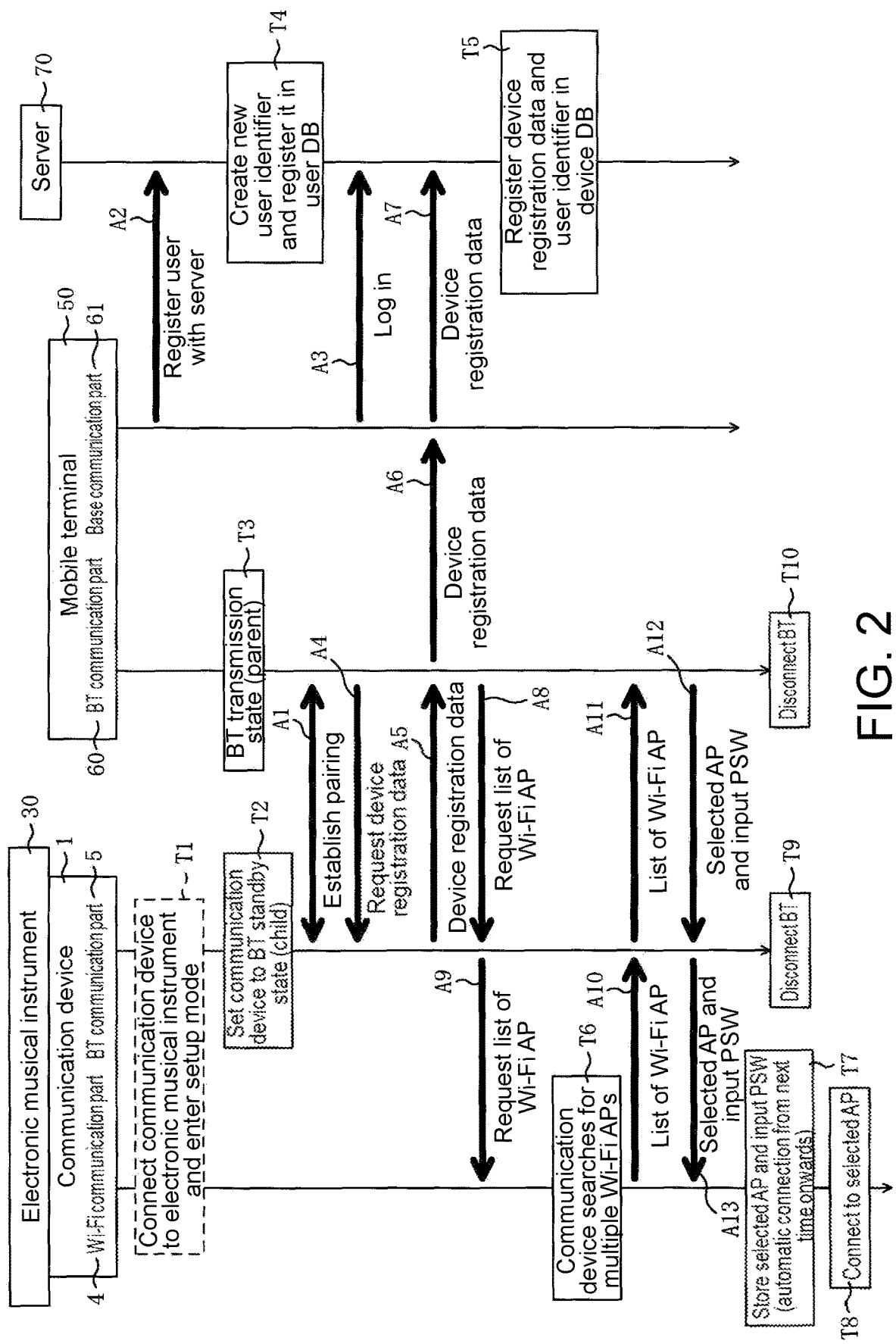
FIG. 2 illustrates communication performed by a communication device, an electronic musical instrument, a mobile terminal and a server in a setup mode.
Figure 3:
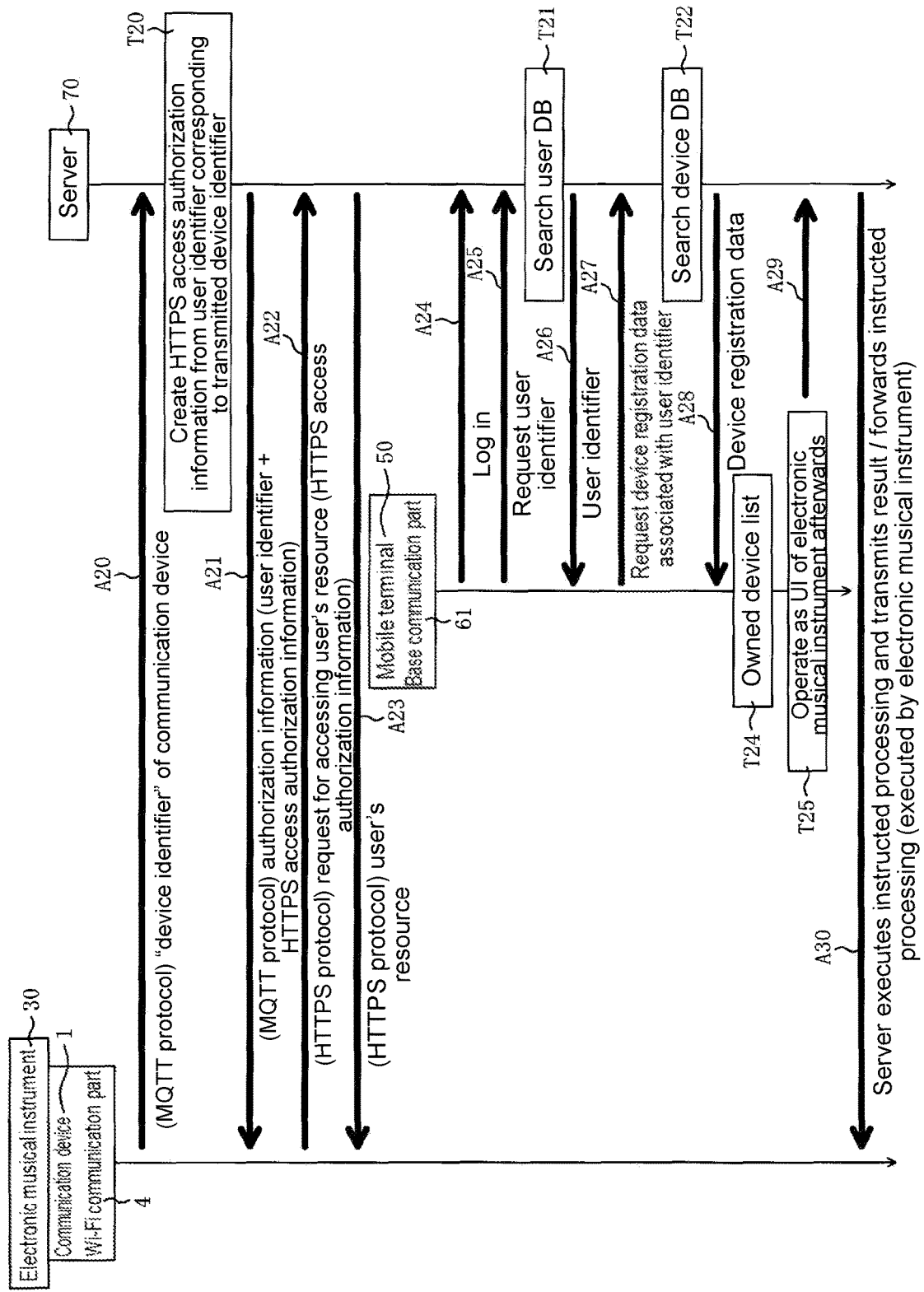
FIG. 3 illustrates communication performed by a communication device, an electronic musical instrument, a mobile terminal and a server after the setup mode.

Next, communication performed by the communication device 1, the electronic musical instrument 30, the mobile terminal 50 and the server 70 is described with reference to FIG. 2 and FIG. 3. FIG. 2 illustrates the communication performed by the communication device 1, the electronic musical instrument 30, the mobile terminal 50 and the server 70 in a setup mode. In the communication system S, in the case where an instruction for a setup mode is given from the user H to the communication device 1 via the operation button 2, connection to each of the communication device 1, the electronic musical instrument 30, the mobile terminal 50 and the server 70 is performed.

Among them, the communication device 1 is provided with a Wi-Fi communication part 4 that performs communication by Wi-Fi and a BT communication part 5 that performs communication by Bluetooth. The mobile terminal 50 is provided with a BT communication part 60 that performs communication by Bluetooth and a base communication part 61 that communicates with a mobile phone base station 100 (hereinafter abbreviated as "base station 100").

The setup mode is a mode for the communication device 1 to acquire from the mobile terminal 50 the information about the AP 90 (one selected as a connection destination by the user H) to be connected by Wi-Fi in order to connect the communication device 1 to the AP 90. In the setup mode, reception of the information about the AP 90 from the mobile terminal 50 to the communication device 1 is performed by Bluetooth via the BT communication part 5. In the setup mode, the communication of the information about the AP 90 is not necessarily performed by Bluetooth but may be performed by other short-range wireless communication standards such as ZigBee®.

First, in the case where the communication device 1 is inserted into the electronic musical instrument 30 and the operation button 2 of the communication device 1 is pressed and held (for example, the operation button is continuously pressed for 5 seconds), the communication device 1 shifts to the setup mode (T1). The user H may be notified that the communication device 1 is in the setup mode by blinking the LED 3 at intervals of a predetermined time (for example, 0.5 second) during execution of the setup mode.

The instruction for the setup mode is not limited to the case where the operation button 2 is pressed and held. It is fine to shift to the setup mode in the case where the operation button 2 is pressed a predetermined number of times (for example, three times) in succession. The shift to the setup mode is not necessarily performed by operating the operation button 2 of the communication device 1. For example, it is fine to shift to the setup mode in response to an instruction from the electronic musical instrument 30 connected to the communication device 1. Alternatively, in the case where the communication device 1 is inserted into the electronic musical instrument 30 while the information about the AP 90 and the password for connecting to the AP 90 have not been set (stored) in the communication device 1, it is fine to automatically shift to the setup mode without waiting for operation of the operation button 2.

In order to pair the communication device 1 that has shifted to the setup mode by the processing of T1 with the mobile terminal 50 by Bluetooth, the BT communication part 5 is set to a standby state, that is, a slave (child) state (T2). On the other hand, in the mobile terminal 50, in the case where the instruction for the setup mode is input to the mobile terminal 50, the BT communication part 60 is set to a transmission state, that is, a master (parent) state (T3). The mobile terminal 50 that has discovered the communication device 1 in the standby state by the processing of T3 establishes pairing with the communication device 1 (A1).

In the pairing between the communication device 1 and the mobile terminal 50 in the processings of T2 and T3, the communication device 1 is set to the standby state and the mobile terminal 50 is set to the transmission state. However, the disclosure is not limited thereto. The mobile terminal 50 may be set to the standby state and the communication device 1 may be set to the transmission state.

Here, the mobile terminal 50 registers the user H with the server 70 via the base communication part 61 before the processings of T3 and A1 (A2). In response to such user registration, the server 70 creates a user identifier being a unique identifier for each user and registers the user identifier in a user DB 72*b* (see FIG. 7A) of the server 70 (T4). After the processing of T4, the mobile terminal 50 logs in to the server 70 by the user H (A3). At the time of login, hypertext transfer protocol secure (HTTPS) access authorization information is transmitted from the server 70 to the mobile terminal 50, and will be used for subsequent HTTPS protocol communication from the mobile terminal 50 to the server 70.

After the pairing by the processing of A1 is established, the mobile terminal 50 requests device registration data from the communication device 1 via the BT communication part 60 (A4). The device registration data is composed of a device identifier being an identifier uniquely set for each communication device 1 and product information indicating a product name or the like of the communication device 1. The device identifier of the communication device 1 like this is registered with the server 70 to be described later. Since the device identifier is uniquely set for each communication device 1, even if the user H owns multiple electronic musical instruments 30, by sharing and using one registered communication device 1 in the multiple electronic musical instruments 30, time and effort to register with the server 70 for each electronic musical instrument 30 can be saved.

The device identifier is not limited to an identifier unique to each communication device 1, but may be an identifier that identifies the electronic musical instrument 30 connected to the communication device 1. Accordingly, the electronic musical instrument 30 can be uniquely identified even if the communication device 1 connected to the electronic musical instrument 30 is changed.

In response to the request for device registration data by the processing of A4, the communication device 1 transmits the device registration data including its own device identifier and product information to the mobile terminal 50 via the BT communication part 5 (A5). The mobile terminal 50 that has received the device registration data of the communication device 1 by the processing of A5 transmits the device registration data to the server 70 via the base communication part 61 (A6, A7).

The server 70 registers the device registration data received by the processing of A7 in a device DB 72*c* (see FIG. 7B) together with the user identifier corresponding to the user H who has logged in by the above processing of A3 (T5). Thus, the user identifier of the logged-in user H and the device registration data of the communication device 1 connected to the electronic musical instrument 30 used by the user H are stored in association in the device DB 72*c*.

After transmission of the device registration data of the communication device 1 by the above processing of A5, in order to acquire the list of APs 90 searched by the communication device 1, the mobile terminal 50 requests the list of APs 90 from the communication device 1 via the BT communication part 60 (A8). The request for the list of APs 90 received by the BT communication part 5 of the communication device 1 by the processing of A8 is transmitted to the Wi-Fi communication part 4 (A9). In the Wi-Fi communication part 4 that has received the request for the list of APs 90 by the processing of A9, the Wi-Fi communication part 4 searches for the AP 90 capable of communication, and creates a list of APs 90 searched (T6).

The BT communication part 5 acquires the list of APs 90 created by the Wi-Fi communication part 4 by the processing of T6 (A10), and transmits the list of APs 90 to the mobile terminal 50 via the BT communication part 5 (A11). The mobile terminal 50 that has received the list of APs 90 by the processing of A11 displays the list of APs 90 and causes the user H to select one of the APs 90. Such an AP 90 is specified as one to which the Wi-Fi communication part 4 of the communication device 1 performs connection. Then, the selected (specified) AP 90 and the password (input PSW) for connecting to the AP 90 are acquired, and are transmitted to the communication device 1 via the BT communication part 60 (A12).

The communication device 1 that has received the selected AP 90 and the input PSW thereof by the processing of A12 transmits these information to the Wi-Fi communication part 4 (A13) and stores these information (T7). After the processing of T7, the Wi-Fi communication part 4 connects to the AP 90 in the received information by using the received input PSW (T8).

From this point on, or in the case where the communication system S does not shift to the setup mode, the communication device 1 is connected to the AP 90 using the information stored by the processing of T7. Accordingly, the communication device 1 and the electronic musical instrument 30 are connected to the AP 90 via the Wi-Fi communication part 4, and are able to communicate with the server 70 via the AP 90 and the Internet N.

In the BT communication part 5 of the communication device 1 and the BT communication part 60 of the mobile terminal 50, in the case where the transmission by the processing of A12 is completed, the communication by Bluetooth is disconnected and the pairing is canceled (T9, T10). In the present embodiment, the device registration data is first registered with the server 70 by the processings of A4 to A7, and after that, the information about the AP 90 or the like is transmitted from the mobile terminal 50 to the communication device 1 by the processings of A8 to A13, T6, and T7. However, the disclosure is not limited thereto. The processings of A8 to A13, T6, and T7 may be performed first, followed by the processings of A4 to A7, or the processings of A4 to A7 may be performed in parallel with the processings of A8 to A13, T6, and T7.

As described above, in the setup mode, the information about the AP 90 connected by the Wi-Fi communication part 4 of the communication device 1 is transmitted from the mobile terminal 50 by communication by Bluetooth. Accordingly, the AP 90 can be connected without inputting the information about the AP 90, that is, the target AP 90 and the input PSW thereof, by the communication device 1 and the electronic musical instrument 30 that are more restricted in input device as compared with the mobile terminal 50. Accordingly, the time and effort to be spent by the user H when connecting the communication device 1 and the electronic musical instrument 30 to the AP 90 can be reduced, and communication between the communication device 1 and the server 70 and between the electronic musical instrument 30 and the server 70 can be easily established.

Here, when the AP information is to be transmitted by Bluetooth communication, it is necessary to pair the BT communication part 5 of the communication device 1 with the BT communication part 60 of the mobile terminal 50. However, in such pairing, there is no need for the user H to input authentication information or the like. Thus, the time and effort to be spent by the user H when connecting the communication device 1 and the electronic musical instrument 30 to the AP 90 can be reduced.

When the pairing between the BT communication part 5 of the communication device 1 and the BT communication part 60 of the mobile terminal 50 is established, the device registration data of the communication device 1 is transmitted to the server 70 via the mobile terminal 50, and is registered in the device DB 72*c* together with the user identifier of the user H who has logged in to the server 70 from the mobile terminal 50. Accordingly, the device registration data of the communication device 1 can be reliably registered with the server 70 in association with the user identifier of the user H.

Based on the device registration data and the user identifier registered with the server 70 in this way, after the setup mode, a resource stored on the server 70 can be accessed from the electronic musical instrument 30. Further, when the pairing between the BT communication part 5 of the communication device 1 and the BT communication part 60 of the mobile terminal 50 is established, since the device registration data of the communication device 1 is automatically transmitted to the server 70, the time and effort to be spent by the user H when registering the device registration data with the server 70 can be reduced.

Next, communication performed by the communication device 1, the electronic musical instrument 30, the mobile terminal 50 and the server 70 after the communication device 1 is connected to the AP 90 by the setup mode of FIG. 2 is described. FIG. 3 illustrates the communication performed by the communication device 1, the electronic musical instrument 30, the mobile terminal 50 and the server 70 after the setup mode.

In the communication system S, after the setup mode, a resource stored on the server 70 is received by the communication device 1, and the received resource is utilized by the electronic musical instrument 30. Specifically, first, the device identifier of the communication device 1 is transmitted from the communication device 1 to the server 70 via the Wi-Fi communication part 4 (A20). In the processing of A20, the transmission of the device identifier from the communication device 1 to the server 70 is performed by communication using a message queuing telemetry transport (MQTT) protocol. The communication of the communication device 1 with the server 70 in and after A20 is performed via the Wi-Fi communication part 4.

The server 70 that has received the device identifier by the processing of A20 acquires the user identifier corresponding to the device identifier from the device DB 72*c* (see FIG. 7B), and creates the HTTPS access authorization information based on the user identifier (T20). The HTTPS access authorization information is information for authorizing to access a resource of the user H when the communication device 1 communicates with the server 70 by HTTPS.

The HTTPS access authorization information created by the processing of T20 and the user identifier corresponding to the device identifier transmitted by the processing of A20 are transmitted to the communication device 1 by communication using an MQTT protocol (A21). The user identifier received by the processing of A21 will be used for subsequent communication between the communication device 1 and the server 70 using an MQTT protocol. The user identifier and the HTTPS access authorization information received together with the user identifier will be used for subsequent communication between the communication device 1 and the server 70 using an HTTPS protocol.

After the processing of A21, a request for accessing the resource of the user H is transmitted from the communication device 1 to the server 70 in response to an instruction from the electronic musical instrument 30 (A22). The transmission of the request in the processing of A22 is performed by communication using an HTTPS protocol, and at that time, the request is transmitted including the user identifier and the HTTPS access authorization information received by the processing of A21.

In the case where the server 70, upon receiving the request by the processing of A22, determines that the HTTPS access authorization information is valid for the requested resource, the server 70 transmits the resource to the communication device 1 that made the request by the processing of A22 (A23). The transmission from the server 70 to the communication device 1 by the processing of A23 is also performed by communication using an HTTPS protocol, like the processing of A22. The resource transmitted by the processing of A23 is transmitted from the communication device 1 to the electronic musical instrument 30, and is utilized by the electronic musical instrument 30. In the processing of A22, in order to confirm (verify) whether the requested resource belongs to the user H, the user identifier included in the received request may be confirmed, or both the HTTPS access authorization information and the user identifier may be confirmed.

As described above, after the setup mode, the communication device 1 transmits its own device identifier to the server 70, and the user identifier corresponding to the device identifier and the HTTPS access authorization information created based on the user identifier are transmitted from the server 70 to the communication device 1. The communication device 1 acquires the resource from the server 70 by using the received HTTPS access authorization information or user identifier, and the resource acquired by the communication device 1 is utilized by the electronic musical instrument 30. That is, when the resource on the server 70 is to be acquired in the electronic musical instrument 30, the resource can be directly acquired from the server 70 without via another recording medium or the like. Accordingly, the resource on the server 70 can be easily acquired and utilized on the electronic musical instrument 30.

Further, the communication device 1 receives the HTTPS access authorization information created based on the user identifier of the user H of the connected electronic musical instrument 30 or the user identifier, and acquires the resource of the user H from the server 70 by using these information. That is, since the resource of the user H corresponding to the communication device 1 is acquired by the electronic musical instrument 30 of the user H, it can be prevented that a resource of another user H is accessed by the electronic musical instrument 30 of the user H.

The transmission of the device identifier from the communication device 1 by the processing of A20 and the transmission of the user identifier and the HTTPS access authorization information from server 70 by the processing of A21 are performed by communication using an MQTT protocol. Since communication using an MQTT protocol is lighter than communication using an HTTPS protocol, the transmission of the device identifier and the transmission of the user identifier and the HTTPS access authorization information by the processings of A20 and A21 can be quickly performed.

Further, the acquisition of the HTTPS access authorization information and the user identifier from the server 70 by the communication device 1 is performed every time immediately after the communication between the communication device 1 and the server 70 is established, whether the setup mode has been executed or not. Accordingly, since the HTTPS access authorization information in particular will be the latest when communication with the server 70 is established, it can be prevented that the same HTTPS access authorization information is used for a long period of time.

For example, by regularly updating the format of the HTTPS access authorization information transmitted by the server 70 to the communication device 1, even if the HTTPS access authorization information or the request by the processing of A22 based on the HTTPS access authorization information is leaked, after the HTTPS access authorization information is updated, no more resources can be acquired from the server 70 by the leaked HTTPS access authorization information. Thus, leakage of the resource on the server 70 can be relatively effectively prevented.

The communication of A20 and A21 is not limited to communication using an MQTT protocol, and may be other communication methods such as communication using an HTTPS protocol. Also, the communication of A22 and A23 is not limited to communication using an HTTPS protocol, and may be other communication methods such as communication using an MQTT protocol.

In addition to utilization of the resource on the server 70 by the electronic musical instrument 30 in response to an instruction of the user H given to the electronic musical instrument 30 in this way, the resource on the server 70 can be utilized by the electronic musical instrument 30 in response to an instruction of the user H given to the mobile terminal 50. Such utilization of the resource on the server 70 by the electronic musical instrument 30 in response to the instruction to the mobile terminal 50 is described.

After the setup mode described with reference to FIG. 2, the mobile terminal 50 logs in to the server 70 via the base communication part 61 (A24). At the time of login, a HTTPS access authorization information is transmitted from the server 70 to the mobile terminal 50, and will be used for subsequent HTTPS protocol communication from the mobile terminal 50 to the server 70. The login by the processing of A24 may be omitted in the case where the login by the processing of A3 of FIG. 2 described above continues (that is, in the case where no logout has occurred). Subsequent communication of the mobile terminal 50 with the server 70 will be performed via the base communication part 61.

After the processing of A24, the user identifier of the logged-in user H is requested (A25), the server 70 searches the user DB 72b for the requested user identifier (T21), and the searched user identifier is transmitted to the mobile terminal 50 that made the request for the user identifier (A26). The mobile terminal 50 requests from the server 70 the device registration data corresponding to the user identifier received by the processing of A26 (A27).

The server 70 searches the device DB 72c for the device registration data corresponding to the user identifier requested by the processing of A27 (T22), and transmits the found device registration data to the mobile terminal 50 that made the request (A28).

The mobile terminal 50 registers the device registration data received by the processing of A28 in an owned device list (T24). In the case where multiple pieces of device registration data are registered in the owned device list by the processing of T24, such as where there the user H has multiple electronic musical instruments 30, the user H is caused to select the device registration data corresponding to the communication device 1 of the electronic musical instrument 30 that utilizes the resource on the server 70 according to the instruction to the mobile terminal 50.

After the processing of T24, the mobile terminal 50 operates as a user interface (UI) of the electronic musical instrument 30 to which the communication device 1 corresponding to the selected device registration data is connected (T25). An instruction given to the electronic musical instrument 30 or the server 70 and accompanying information, and a request based on the user identifier received by the processing of A26 and the device identifier of the selected device registration data are transmitted from the mobile terminal 50 to the server 70 (A29).

The server 70 transmits the request by the processing of A29 to the communication device 1, the communication device 1 transmits the request received from the server 70 to the electronic musical instrument 30, and processing corresponding to the request is executed in the electronic musical instrument 30 (A30). In the processing of A30, the server 70 may perform necessary processing in response to the request transmitted from the mobile terminal 50, and transmit a result thereof to the communication device 1.

As a specific example of the processings of A29 and A30, a request (including a target parameter name and a set value after change) for instructing that a change be made in the parameter of the electronic musical instrument 30 is transmitted from the mobile terminal 50 to the server 70 (A29). The server 70 transmits the received request to the communication device 1. The communication device 1 transmits the request transmitted from the server 70 to the electronic musical instrument 30. The electronic musical instrument 30 performs processing (parameter setting) according to the received request (A30). Other requests transmitted by the processing of A29 include transmission of a parameter value of the electronic musical instrument 30 to the mobile terminal 50.

As another specific example of the processings of A29 and A30, the server 70 may perform necessary processing in response to the request transmitted from the mobile terminal 50, and transmit a result thereof to the communication device 1. In this case, a request (including information for specifying resources) for instructing that a list of predetermined resources stored on the server 70 be displayed is transmitted from the mobile terminal 50 to the server (A29). In response to the request, the server 70 creates a list of applicable resources and transmits a request (including the created list) instructing that the list be displayed to the communication device 1. The communication device 1 transmits the received request to the electronic musical instrument 30, and the electronic musical instrument 30 displays the list on an LCD 36 (see FIG. 5) to be described later (A30).

As yet another specific example of the processings of A29 and A30, the electronic musical instrument 30 may transmit a request to the server 70 in response to the request transmitted from the communication device 1, and acquire a result of processing of the request in the server 70. In this case, a request (including information for specifying a resource) for instructing that a resource utilized by the electronic musical instrument 30 be acquired from the server 70 is transmitted from the mobile terminal 50 to the server 70 (A29).

The server 70 transmits the received request to the communication device 1, and the communication device 1 transmits the transmitted instruction to the electronic musical instrument 30. Based on the received instruction, the electronic musical instrument 30 transmits a request to the communication device 1 instructing that the specified resource be transmitted to the electronic musical instrument 30. The communication device 1 transmits the request to the server 70. The server 70 transmits the resource specified by the received request to the communication device 1. The communication device 1 transmits the received resource to the electronic musical instrument 30. The electronic musical instrument 30 utilizes the resource transmitted from the communication device 1 (A30).

As described above, the instruction (request) from the mobile terminal 50 is transmitted from the server 70 to the communication device 1 and the electronic musical instrument 30. The mobile terminal 50 is equipped with a display device having more abundant functions than the communication device 1 and the electronic musical instrument 30. The user H inputs to the mobile terminal 50 like this an instruction to cause the electronic musical instrument 30 to utilize the resource on the server 70, and the instruction is transmitted to the electronic musical instrument 30 via the server 70. Thereby, the user H is able to easily realize utilization of the resource on the server 70 by the electronic musical instrument 30 without operating the electronic musical instrument 30. Accordingly, usability for the user H concerning resource utilization by the electronic musical instrument 30 can be improved.

In the processings of A24 to A28, after the mobile terminal 50 logs in to the server 70, the user identifier is requested to the server 70, the requested user identifier is transmitted to the mobile terminal 50, and the mobile terminal 50 transmits the transmitted user identifier to the server 70, thereby acquiring the corresponding device registration data from the server 70. However, the disclosure is not limited thereto. When the mobile terminal 50 logs in to the server 70, the user DB 72b may be searched for the user identifier of the logged-in user H, the device DB 72c may be searched for the device registration data corresponding to the searched user identifier, and the searched device registration data may be transmitted to the mobile terminal 50 together with the user identifier. In this case, the processings of A25 and A27 by the mobile terminal 50 and the processing of A26 by the server 70 may be omitted.

Figure 4:
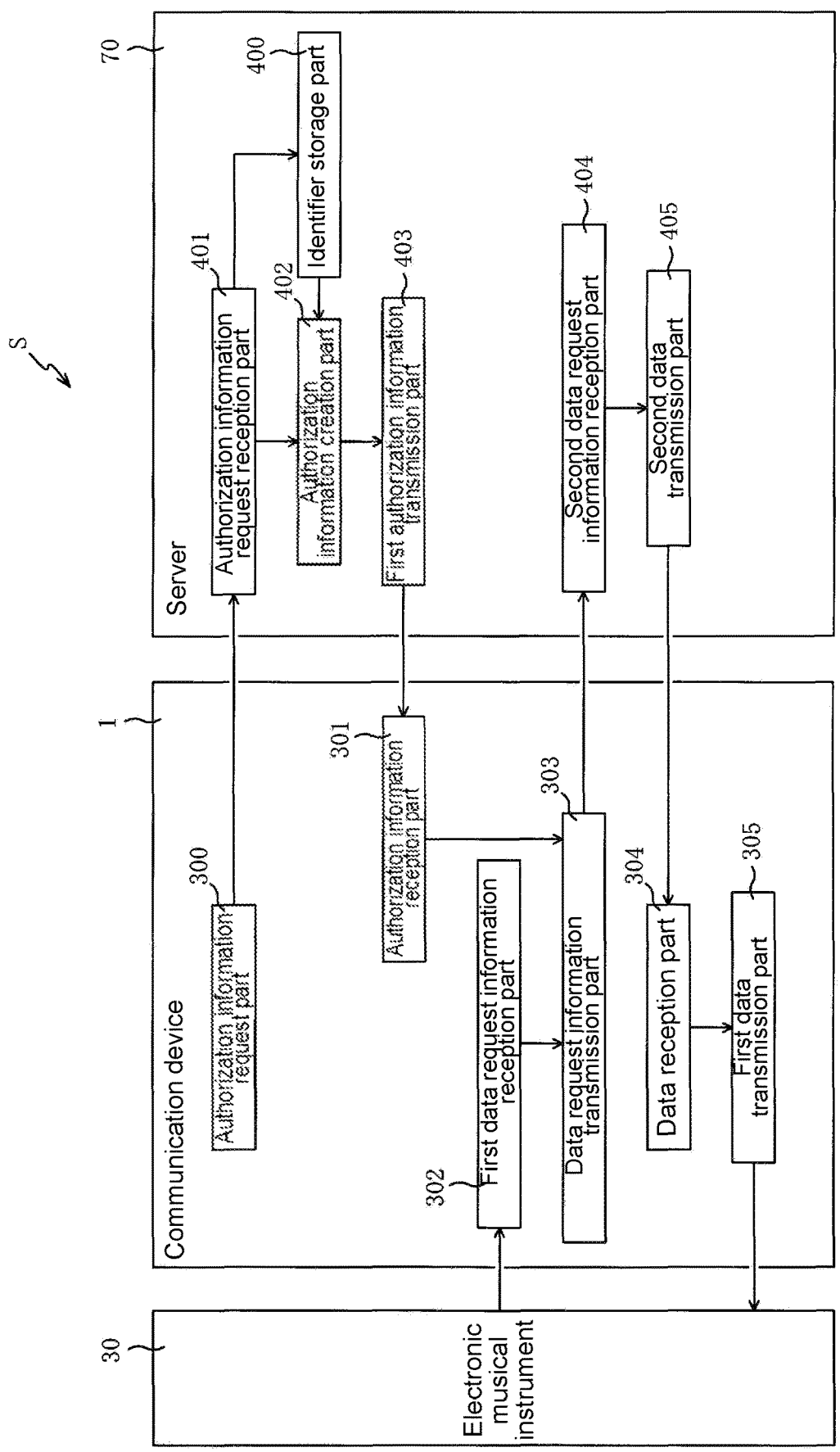
FIG. 4 is a functional block diagram of a communication system.

Next, a function of the communication system S is described with reference to FIG. 4. FIG. 4 is a functional block diagram of the communication system S. As shown in FIG. 4, the communication system S includes the communication device 1, the electronic musical instrument 30, and the server 70. The communication device 1 includes an authorization information request part 300, an authorization information reception part 301, a first data request information reception part 302, a data request information transmission part 303, a data reception part 304, and a first data transmission part 305.

Figure 5:
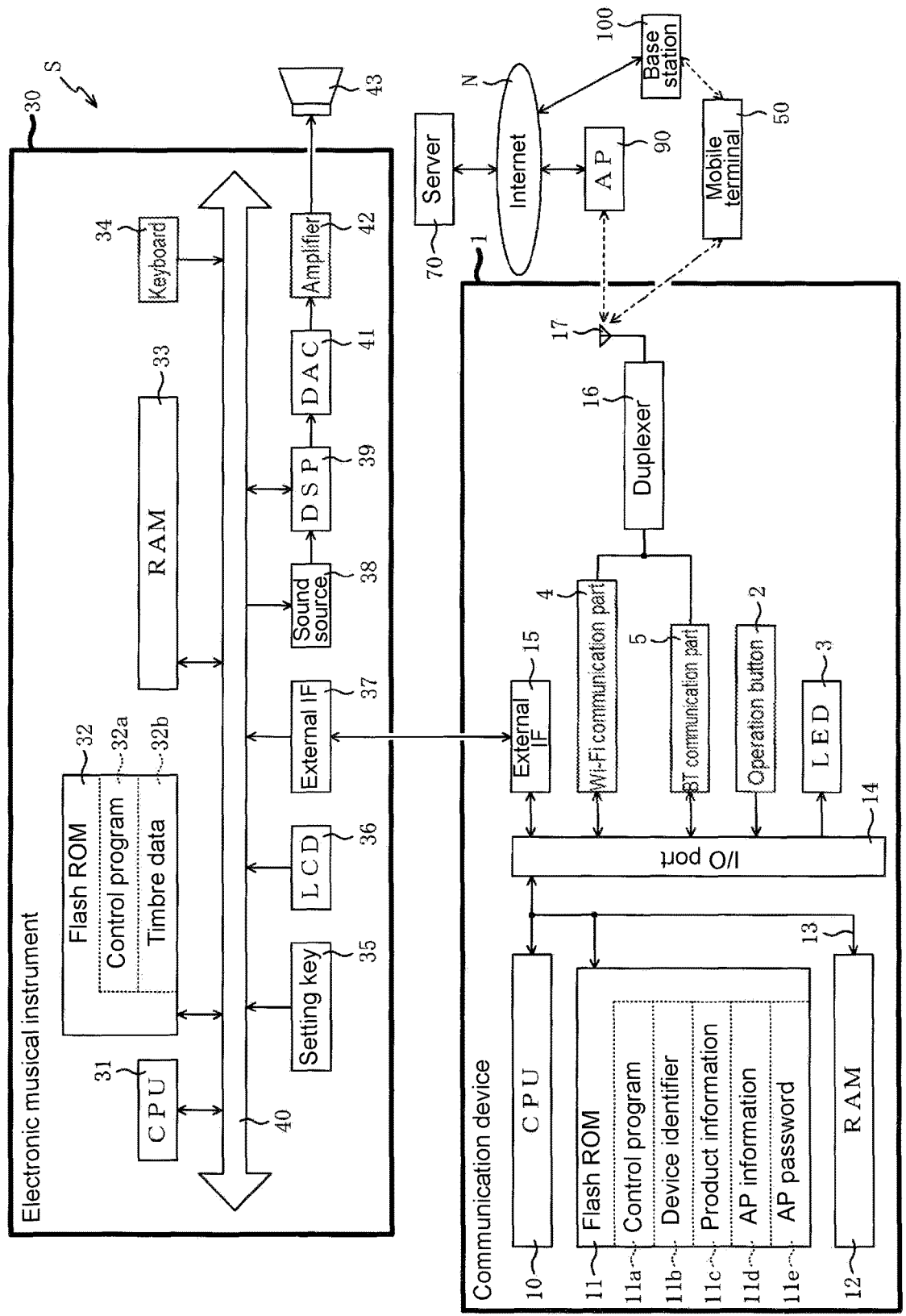
FIG. 5 is a block diagram showing an electrical configuration of a communication device and an electronic musical instrument in a communication system.

The authorization information request part 300 is a means of transmitting a request for authorization information for accessing the server 70 to the server 70 together with the device identifier being an identifier set for each communication device 1, and is realized by a CPU 10 to be described later in FIG. 5. The authorization information reception part 301 is a means of receiving from the server 70 the authorization information according to the request transmitted by the authorization information request part 300, and is realized by the CPU 10. The first data request information reception part 302 is a means of receiving from the electronic musical instrument 30 data request information that requests predetermined data from the server 70, and is realized by the CPU 10.

The data request information transmission part 303 is a means of transmitting to the server 70 the data request information received by the first data request information reception part 302 by using the authorization information received by the authorization information reception part 301, and is realized by the CPU 10. The data reception part 304 is a means of receiving from the server 70 data according to the data request information transmitted by the data request information transmission part 303, and is realized by the CPU 10. The first data transmission part 305 is a means of transmitting to the electronic musical instrument 30 the data received by the data reception part 304, and is realized by the CPU 10.

The server 70 includes an identifier storage part 400, an authorization information request reception part 401, an authorization information creation part 402, a first authorization information transmission part 403, a second data request information reception part 404, and a second data transmission part 405. The identifier storage part 400 is a means of storing a device identifier in association with a user identifier being an identifier for each user who uses the communication device 1 corresponding to the device identifier, and is realized by a hard disk drive 72 (hereinafter abbreviated as "HDD 72") to be described later in FIG. 6. The authorization information request reception part 401 is a means of receiving from the communication device 1 a request for authorization information together with the device identifier of the communication device 1, and is realized by a CPU 71 to be described later in FIG. 6.

The authorization information creation part 402 is a means of acquiring from the identifier storage part 400 the user identifier corresponding to the device identifier received by the authorization information request reception part 401 and creating the authorization information according to a user corresponding to the acquired user identifier, and is realized by the CPU 71. The first authorization information transmission part 403 is a means of transmitting the authorization information created by the authorization information creation part 402 to the communication device 1, and is realized by the CPU 71. The second data request information reception part 404 is a means of receiving the data request information from the communication device 1, and is realized by the CPU 71. The second data transmission part 405 is a means of transmitting to the communication device 1 the data according to the data request information received by the second data request information reception part 404, and is realized by the CPU 71.

That is, in the communication system S, the communication device 1 connected to the electronic musical instrument 30 transmits the device identifier being an identifier set for the communication device 1 itself to the server 70, thereby receiving from the server 70 the authorization information based on the user identifier corresponding to the transmitted device identifier, and transmitting the authorization information to the electronic musical instrument 30. The data request information including the authorization information is received from the electronic musical instrument 30, and the received data request information is transmitted to the server 70. The predetermined data according to the data request information is transmitted from the server 70, and the data is transmitted to the electronic musical instrument 30.

Accordingly, the electronic musical instrument 30 is able to easily receive the predetermined data from the server 70 and utilize the same without via another recording medium or the like. Data is requested to the server 70 by using the authorization information based on the user identifier corresponding to the device identifier uniquely set for the communication device 1. Accordingly, the resource of the user H on the server 70 can be accessed and data can be received without the user H inputting the authentication information (such as account or password) for the server 70 to the electronic musical instrument 30 or the communication device 1.

Next, an electrical configuration of the communication system S is described with reference to FIG. 5 to FIG. 7B. First, an electrical configuration of the communication device 1 and the electronic musical instrument 30 is described with reference to FIG. 5. FIG. 5 is a block diagram showing an electrical configuration of the communication device 1 and the electronic musical instrument 30 in the communication system S. The communication device 1 includes the CPU 10, a flash ROM 11, and a RAM 12 each of which is connected to an I/O port 14 via a bus line 13. The operation button 2, the LED 3, the Wi-Fi communication part 4 and the BT communication part 5 described above and an external IF 15 are further connected to the I/O port 14.

Figure 8A:
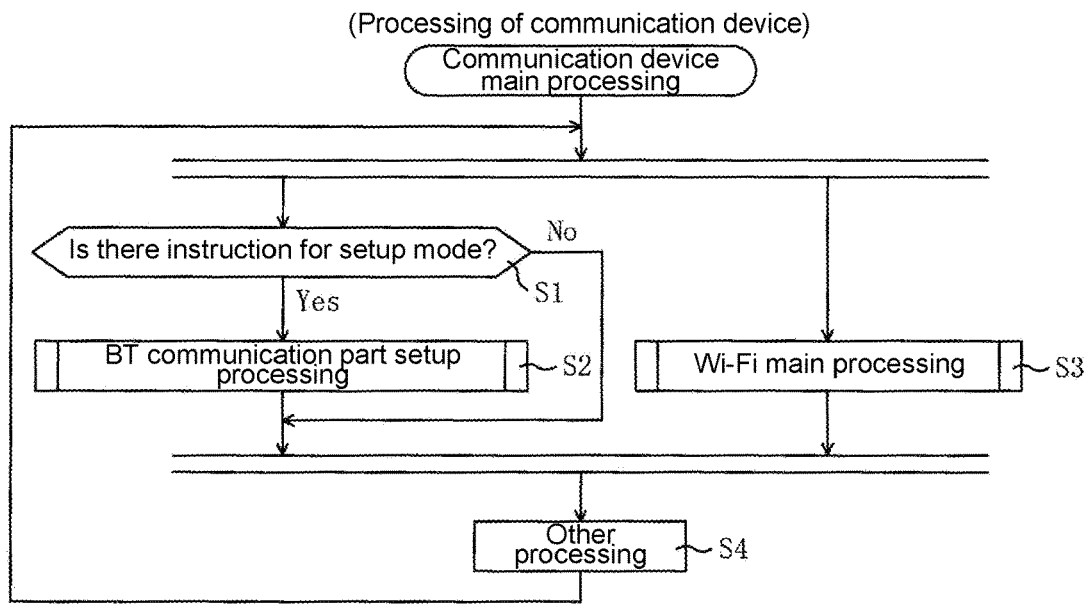
FIG. 8A is a flowchart of communication device main processing.

The CPU 10 is an arithmetic unit that controls each part connected by the bus line 13. The flash ROM 11 is a rewritable non-volatile storage device storing programs executed by the CPU 10 or fixed value data or the like, and includes a control program 11a, a device identifier 11b in which the device identifier of the communication device 1 is stored, product information 11c in which product information of the communication device 1 is stored, AP information 11d in which the information about the selected AP 90 acquired from the mobile terminal 50 is stored, and an AP password 11e in which the input PSW of the selected AP 90 is stored. When the control program 11a is executed by the CPU 10, communication device main processing of FIG. 8A is executed. The RAM 12 is a memory for rewritably storing various work data or flags or the like when the CPU 10 executes a program.

The external IF 15 is a device for connecting to an external device, and is connected to an external IF 37 of the electronic musical instrument 30 to be described later. In the present embodiment, the external IF 15 is composed of a device based on USB standards. However, the external IF 15 may be a device based on a communication standard other than USB. Communication between the communication device 1 and the electronic musical instrument 30 is performed via the external IF 15 and the external IF 37.

The Wi-Fi communication part 4 and the BT communication part 5 are connected to a duplexer 16. The duplexer 16 is a device that integrates radio waves transmitted and received by the Wi-Fi communication part 4 with radio waves transmitted and received by the BT communication part 5. An antenna 17 is connected to the duplexer 16. The radio waves transmitted by the Wi-Fi communication part 4 and the radio waves transmitted by the BT communication part 5 are integrated and transmitted from the antenna 17. The radio waves received by the antenna 17 are appropriately distributed to the Wi-Fi communication part 4 and the BT communication part 5. By connecting the Wi-Fi communication part 4 and the BT communication part 5 to the duplexer 16, transmission and reception of the radio waves of these two communication parts can be realized by one antenna 17. The duplexer 16 may be omitted, and an antenna may be provided in each of the Wi-Fi communication part 4 and the BT communication part 5.

Next, an electrical configuration of the electronic musical instrument 30 is described. The electronic musical instrument 30 includes a CPU 31, a flash ROM 32, a RAM 33, a keyboard 34 acquiring performance information according to a performance of the user H, a setting key 35 for the user H to input various settings, the LCD 36 displaying a setting state of the electronic musical instrument 30 or the like, the external IF 37, a sound source 38, and a digital signal processor 39 (hereinafter referred to as "DSP 39") each of which is connected via a bus line 40.

Figure 15:
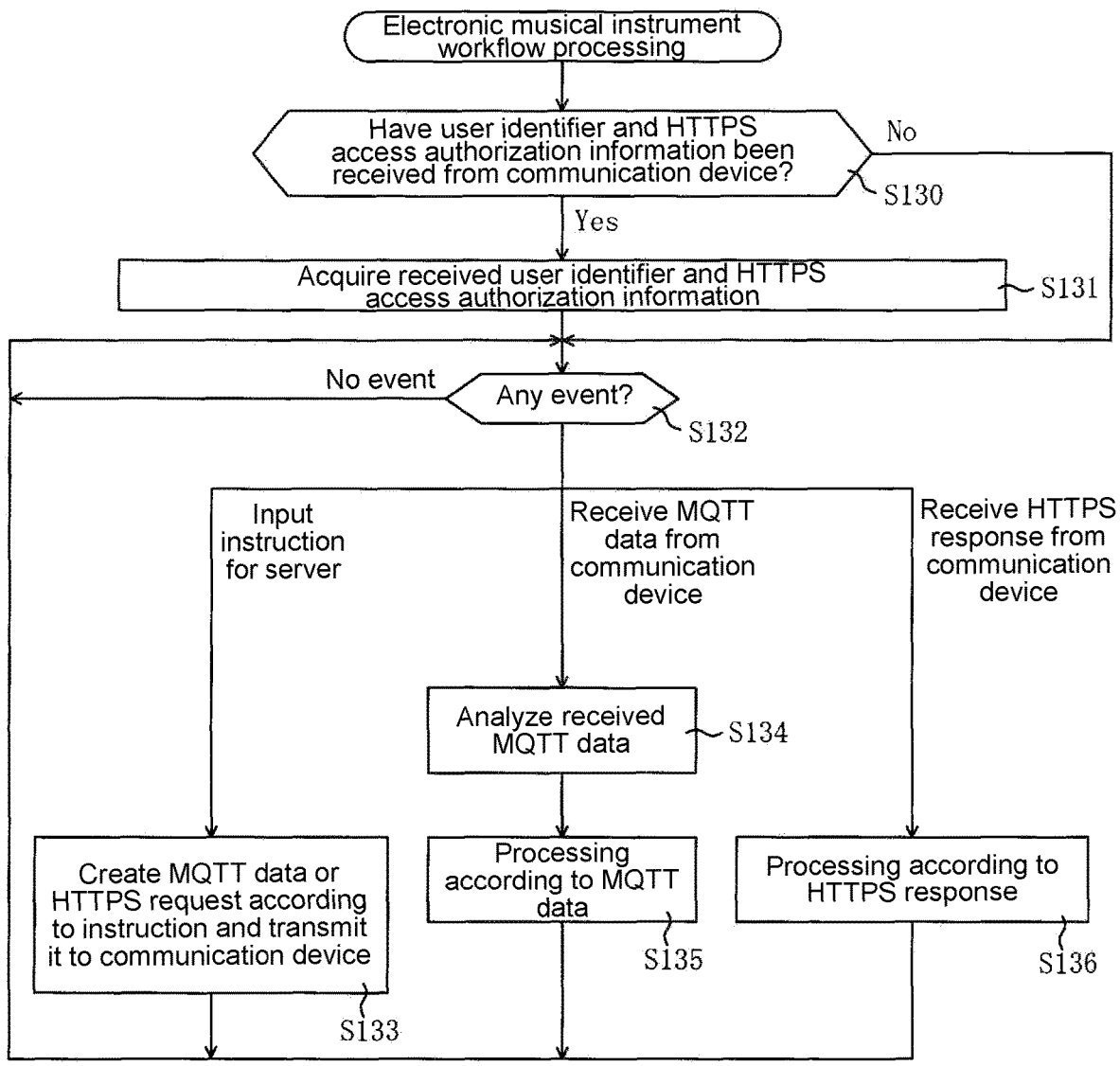
FIG. 15 is a flowchart of electronic musical instrument workflow processing.

The CPU 31 is an arithmetic unit that controls each part connected by the bus line 40. The flash ROM 32 is a rewritable non-volatile storage device storing programs executed by the CPU 31 or fixed value data or the like, and includes a control program 32a, and timbre data 32b in which the timbre data among the resources acquired from the server 70 is stored. When the control program 32a is executed by the CPU 31, electronic musical instrument workflow processing of FIG. 15 is executed. The RAM 33 is a memory for rewritably storing various work data or flags or the like when the CPU 31 executes a program.

The external IF 37 is a device for connecting to an external device, and is connected to the external IF 15 of the communication device 1 described above. In the present embodiment, like the external IF 15, the external IF 37 is composed of a device based on USB standards. However, the external IF 37 may be a device based on a communication standard other than USB if having the same communication standard as the external IF 15.

The sound source 38 is a device that outputs waveform data based on the timbre data 32b according to the performance information input from the keyboard 34. The DSP 39 is an arithmetic unit for arithmetically processing the waveform data input from the sound source 38. The sound source 38 and a digital-to-analog converter (DAC) 41 are connected to the DSP 39, an amplifier 42 is connected to the DAC 41, and a speaker 43 is connected to the amplifier 42.

Figure 6:
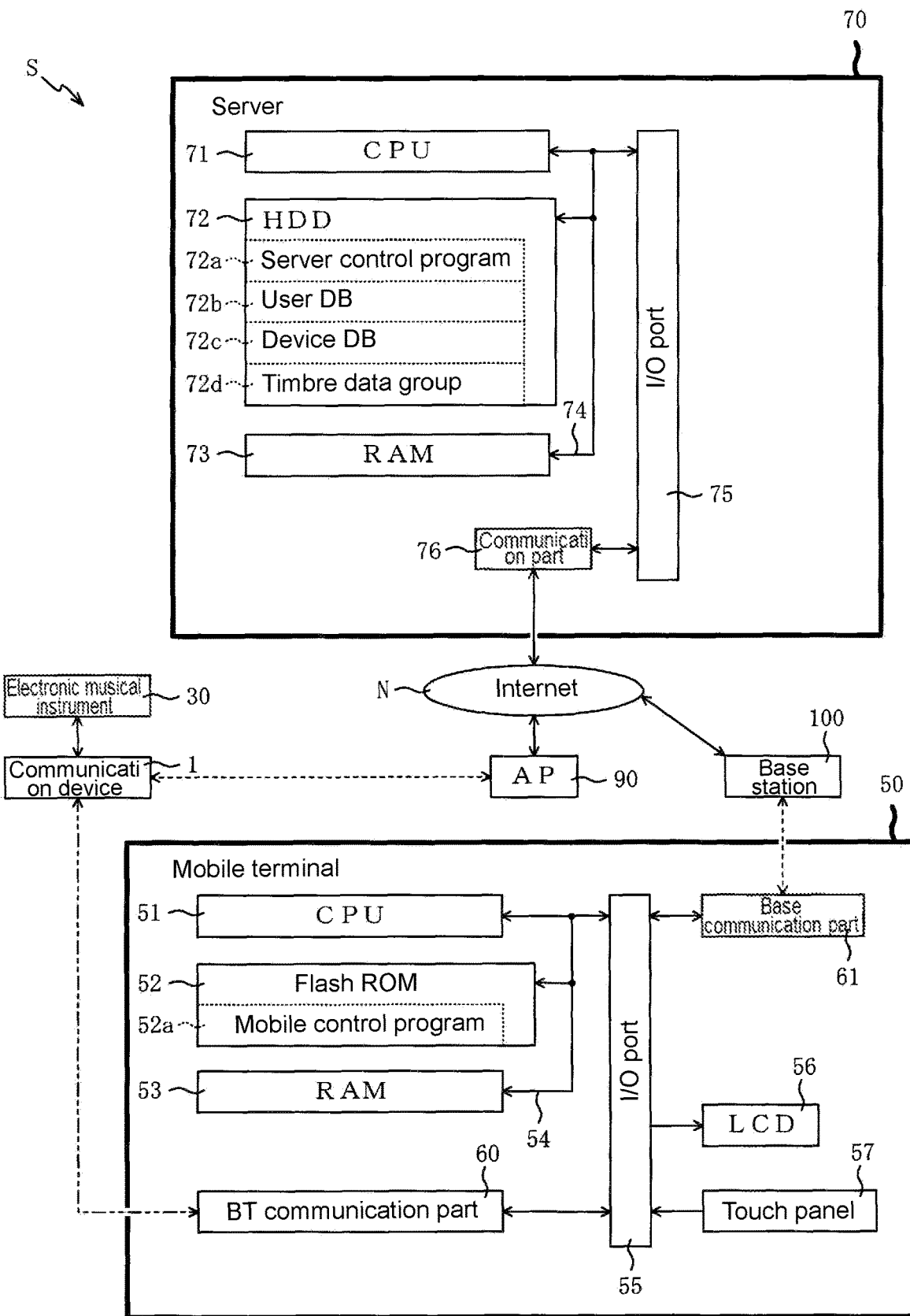
FIG. 6 is a block diagram showing an electrical configuration of a mobile terminal and a server in a communication system.

Next, an electrical configuration of the mobile terminal 50 and the server 70 in the communication system S is described with reference to FIG. 6, FIG. 7A and FIG. 7B. FIG. 6 is a block diagram showing an electrical configuration of the mobile terminal 50 and the server 70 in the communication system S.

The mobile terminal 50 includes a CPU 51, a flash ROM 52, and a RAM 53 each of which is connected to an I/O port 55 via a bus line 54. The BT communication part 60 and the base communication part 61 described above, an LCD 56 displaying a setting state of the mobile terminal 50 or the like, and a touch panel 57 to which an instruction from the user H is input are further connected to the I/O port 55.

Figure 8B:
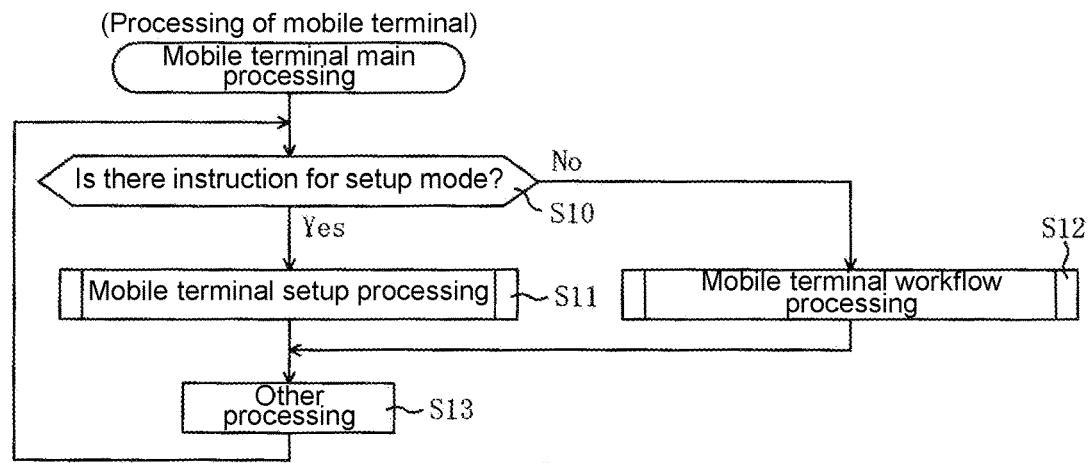
FIG. 8B is a flowchart of mobile terminal main processing.

The CPU 51 is an arithmetic unit that controls each part connected by the bus line 54. The flash ROM 52 is a rewritable non-volatile storage device storing programs executed by the CPU 51 or fixed value data or the like, in which a mobile control program 52a is stored. When the mobile control program 52a is executed by the CPU 51, mobile terminal main processing of FIG. 8B is executed. The RAM 53 is a memory for rewritably storing various work data or flags or the like when the CPU 51 executes a program.

The server 70 includes the CPU 71, the HDD 72, and a RAM 73 each of which is connected to an I/O port 75 via a bus line 74. A communication part 76 that communicates with the Internet N is further connected to the I/O port 75.

Figure 8C:
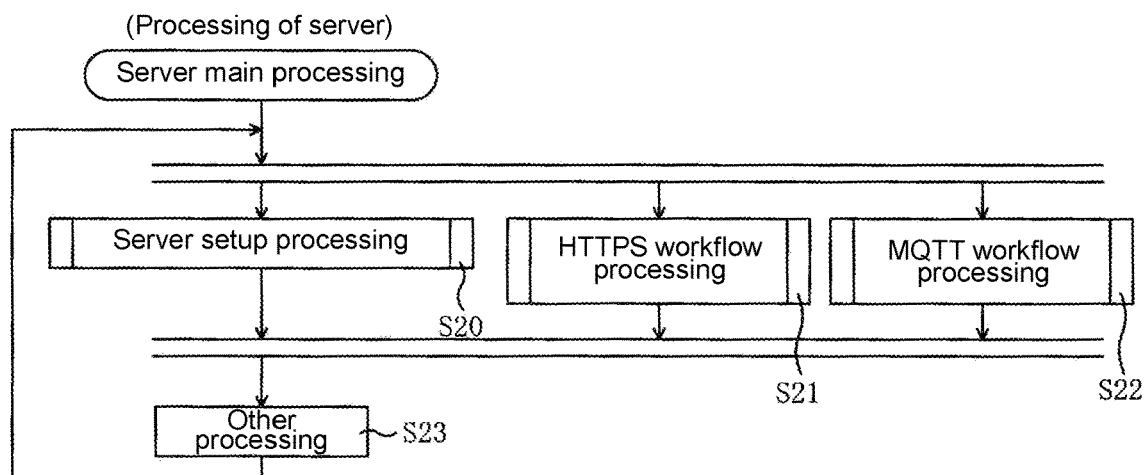
FIG. 8C is a flowchart of server main processing.

The CPU 71 is an arithmetic unit that controls each part connected by the bus line 74. The HDD 72 is a rewritable non-volatile storage device storing programs executed by the CPU 71 or fixed value data or the like, and includes a server control program 72a, the user DB 72b, the device DB 72c, and a timbre data group 72d in which multiple pieces of timbre data to be utilized by the electronic musical instrument 30 are stored. When the server control program 72a is executed by the CPU 71, server main processing of FIG. 8C is executed.

The user DB 72b stores login-related information and the user identifier of the user H who has been registered. The device DB 72c stores the device identifier and the product information of the communication device 1 as well as the user identifier of the user H who utilizes the communication device 1 (electronic musical instrument 30). The user DB 72b and the device DB 72c are described with reference to FIG. 7A and FIG. 7B.

FIG. 7A schematically illustrates the user DB 72b. As shown in FIG. 7A, the user DB 72b stores account (e-mail address) and password being the login-related information of the user H who has been registered in association with the user identifier created when the user H is registered. The account stored in the user DB 72b is not limited to an e-mail address, but may be a name of the user H or a uniquely set arbitrary character string.

FIG. 7B schematically illustrates the device DB 72c. As shown in FIG. 7B, the device DB 72c stores the device identifier and product information of the communication device 1 that has been registered in association with the user identifier of the user H who utilizes the communication device 1 (electronic musical instrument 30). Among them, the device identifier is registered in the device DB 72c at the time of factory shipment of the communication device 1, and the product information and the user identifier are registered in the device DB 72c in the setup mode described above.

Please refer back to FIG. 6. The server 70 performs two types of communication, namely, the communication using an HTTPS protocol and the communication using an MQTT protocol, with the communication device 1 and the mobile terminal 50. Among them, in the communication using an MQTT protocol, the communication with the communication device 1 and the mobile terminal 50 is performed by exchanging a "topic" being a character string including a user identifier and a device identifier of a target to and from which data is to be transmitted and received. Examples of the "topic" include "topic/{user identifier}/{device identifier}/# (#: any command such as data request)".

A "subscribe" function is provided for the communication using an MQTT protocol. In the "subscribe" function, by registering (hereinafter referred to as "subscription registration") the user identifier and device identifier for each communication device 1 and mobile terminal 50 with the server 70 in advance, when a topic is transmitted to the server 70, the server 70 transmits the topic to the communication device 1 and the mobile terminal 50 among the communication device 1 and the mobile terminal 50 that correspond to the user identifier and the device identifier of the topic.

Accordingly, in the subscription registration of each of the communication device 1 (electronic musical instrument 30) and the mobile terminal 50 used by the user H with respect to the server 70, by registering the device identifier of the communication device 1 and the user identifier of the user H, a result obtained by transmitting the topic from the communication device 1 to the server 70 is transmitted to the communication device 1 and also to the mobile terminal 50, and a result obtained by transmitting the topic from the mobile terminal 50 to the server 70 is transmitted to the mobile terminal 50 and also to the communication device 1. By doing so, the communication device 1 and the mobile terminal 50 become able to exchange necessary information via the server 70.

In the subscription registration of the communication device 1, a character string indicating "for the communication device 1" may be registered in addition to the user identifier and the device identifier. In the subscription registration of the mobile terminal 50, a character string indicating "for the mobile terminal 50" may be registered in addition to the user identifier and so on. If registration is performed without addition of these character strings, in the case where a certain topic is processed by the server 70, although a processing result is transmitted as well, the topic transmitted by each of the communication device 1 and the mobile terminal 50 may also be transmitted (returned) to each of them. Even if a processing result according to the topic only needs to be transmitted to one of the communication device 1 and the mobile terminal 50, the processing result may be transmitted to both of them. In order to avoid this, in the subscription registration of the communication device 1, the character string indicating "for the communication device 1" is registered in addition to the user identifier and so on. In the subscription registration of the mobile terminal 50, the character string indicating "for the mobile terminal 50" is registered in addition to the user identifier and so on.

Then, the communication device 1 and the mobile terminal 50 transmit a topic including the character string indicating "for the communication device 1" to the communication device 1 and transmit a topic including the character string indicating "for the mobile terminal 50" to the mobile terminal 50. Further, the server 70 transmits a topic including the character string "for the communication device 1" to a processing result for the topic including the character string indicating "for the communication device 1", and transmits a topic including the character string "for the mobile terminal 50" to a processing result for the topic including the character string indicating "for the mobile terminal 50". By doing so, the communication device 1 and the mobile terminal 50 are able to receive only a topic directed to themselves and a processing result according to the topic.

Next, processing executed by the CPU 10 of the communication device 1, the CPU 51 of the mobile terminal 50, the CPU 71 of the server 70, and the CPU 31 of the electronic musical instrument 30 is described with reference to FIG. 8A to FIG. 19. First, main processing of the communication device 1, the mobile terminal 50 and the server 70 is described with reference to FIG. 8A to FIG. 8C. FIG. 8A is a flowchart of the communication device main processing, FIG. 8B is a flowchart of the mobile terminal main processing, and FIG. 8C is a flowchart of the server main processing.

The communication device main processing is processing executed in the case where power of the communication device 1 is turned on. As shown in FIG. 8A, in the communication device main processing, first, it is confirmed whether an instruction for the setup mode has been given by a long pressing operation on the operation button 2 (S1). In the processing of S1, if there is an instruction for the setup mode (S1: Yes), BT communication part setup processing (S2) is executed; if there is no instruction for the setup mode (S1: No), the BT communication part setup processing (S2) is skipped. Wi-Fi main processing (S3) is executed in parallel with the processings of S1 and S2. In the BT communication part setup processing, the processing concerning the BT communication part 5 in the setup mode is performed, and details thereof will be described later in FIG. 9.

Figure 14:
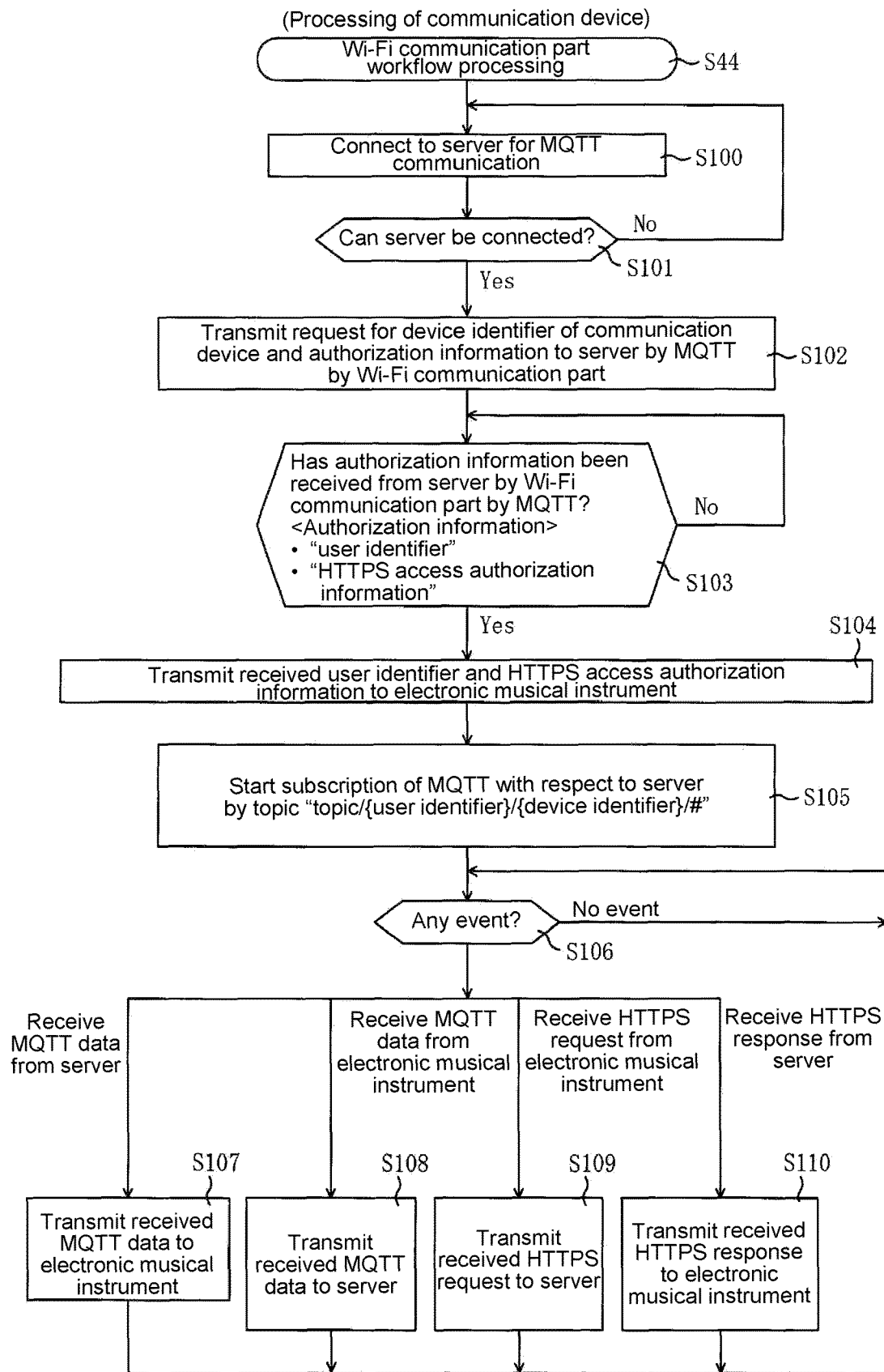
FIG. 14 is a flowchart of Wi-Fi communication part workflow processing.

In the Wi-Fi main processing, processing (specifically, Wi-Fi setup processing to be described later in FIG. 10) concerning the Wi-Fi communication part 4 in the setup mode and processing (specifically, Wi-Fi communication part workflow processing to be described later in FIG. 14) concerning the Wi-Fi communication part 4 after the setup mode are performed. Details thereof will be described later.

After the processings of S1 to S3, other processing (S4) concerning the communication device 1 is executed, and after that, the processings of S1 to S3 onwards are repeated. The processings of S1 and S2 and the processing of S3 are not necessarily executed in parallel. The processing of S3 may be executed after the processings of S1 and S2, or the processings of S1 and S2 may be executed after the processing of S3.

The mobile terminal main processing is processing executed in the case where an application program for the communication system S is launched on the mobile terminal 50. As shown in FIG. 8B, in the mobile terminal main processing, first, it is confirmed whether there is an instruction for the setup mode via the touch panel 57 (S10). In the processing of S10, if there is an instruction for the setup mode (S10: Yes), mobile terminal setup processing (S11) is executed; if there is no instruction for the setup mode (S10: No), mobile terminal workflow processing (S12) is executed.

Figure 12:
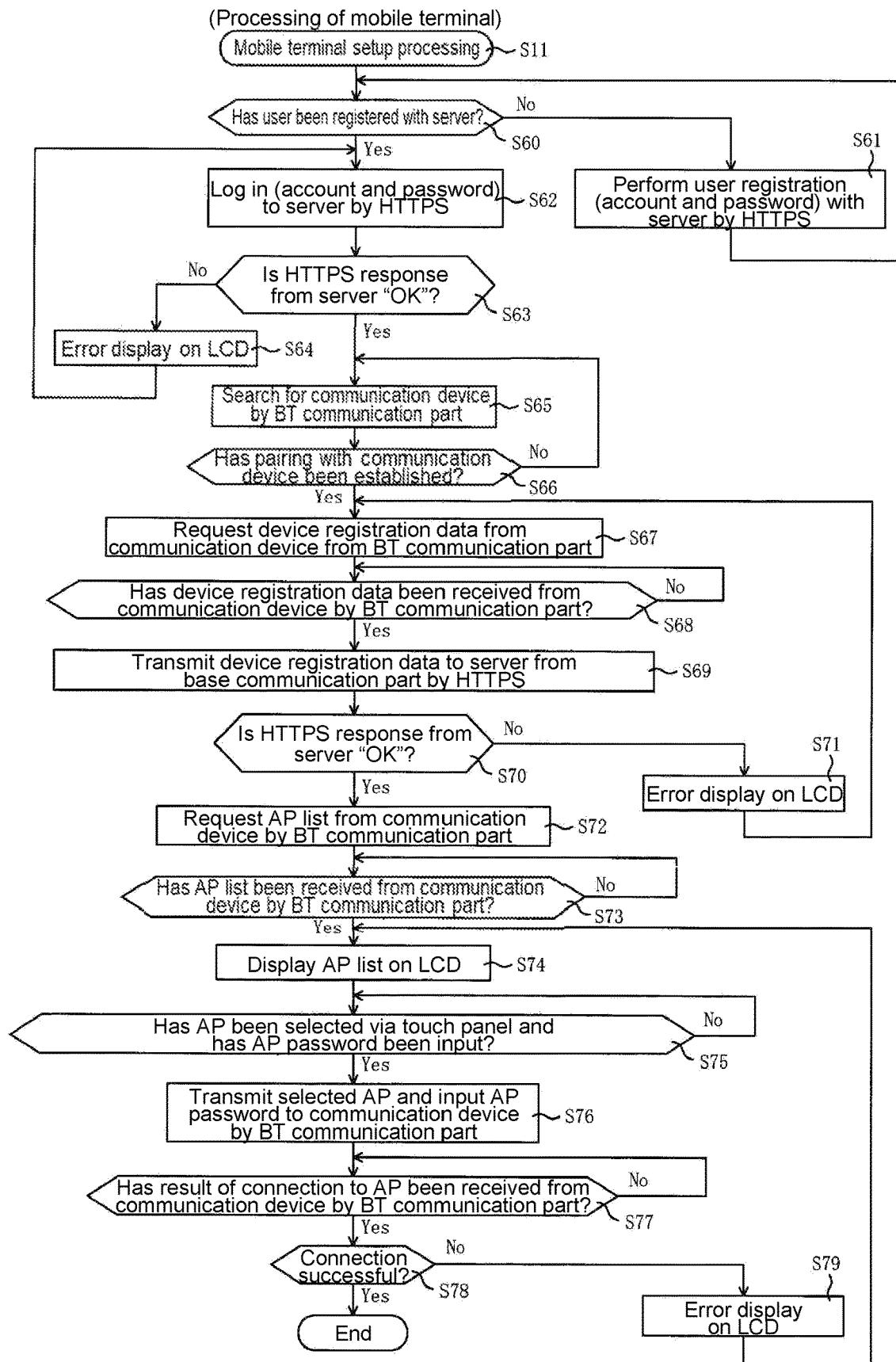
FIG. 12 is a flowchart of mobile terminal setup processing.

The mobile terminal setup processing of S11 is processing in the setup mode of the mobile terminal 50, and details thereof will be described later in FIG. 12. The mobile terminal workflow processing of S12 is processing of the mobile terminal 50 after the setup mode, and details thereof will be described later in FIG. 16. After the processings of S11 and S12, other processing (S13) concerning the mobile terminal 50 is executed, and after that, the processing of S10 onwards is repeated.

The server main processing is processing executed in the case where power of the server 70 is turned on. As shown in FIG. 8C, in the server main processing, first, server setup processing (S20), HTTPS workflow processing (S21) and MQTT workflow processing (S22) are executed in parallel.

Figure 13:
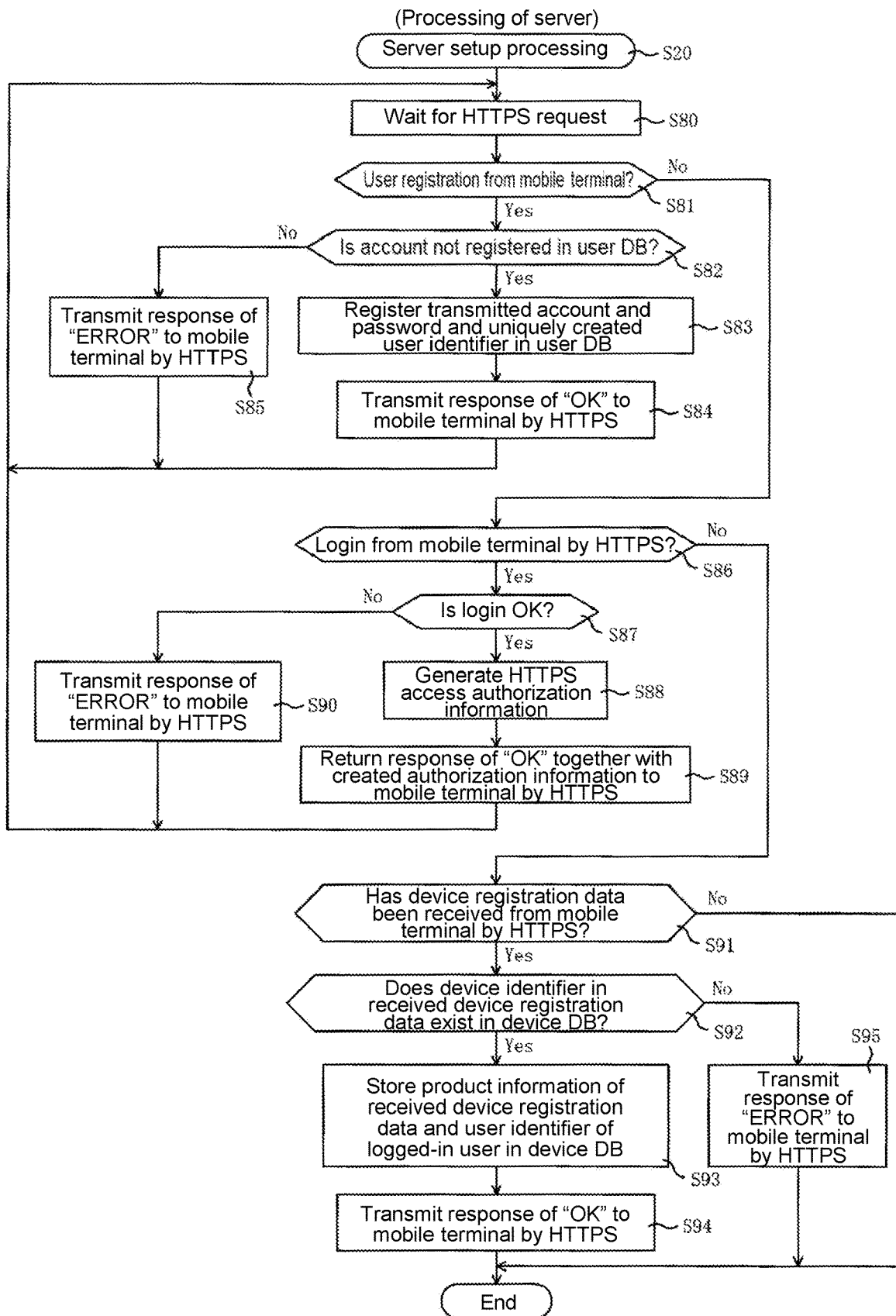
FIG. 13 is a flowchart of server setup processing.

The server setup processing of S20 is processing in the setup mode of the server 70, and details thereof will be described later in FIG. 13. The HTTPS workflow processing of S21 is processing concerning HTTPS protocol communication of the server 70 after the setup mode, and details thereof will be described later in FIG. 17. The MQTT workflow processing of S22 is processing concerning MQTT protocol communication of the server 70 after the setup mode, and details thereof will be described later in FIG. 18. After the processings of S20 to S22, other processing (S23) concerning the server 70 is executed, and after that, the processings of S20 to S22 onwards are repeated.

The three processings of S20 to S22 are not necessarily executed in parallel. For example, the processing of S20, the processing of S21 and the processing of S22 may be executed one by one in this order. Two of the processings of S20 to S22 may be executed in parallel, followed by the remaining processing, in such a way that the processing of S20 and the processing of S21 are executed in parallel, followed by the processing of S22. Or, one of the processings of S20 to S22 may be executed, followed by the remaining processings in parallel, in such a way that the processing of S21 and the processing of S22 are executed in parallel after the processing of S20.

Figure 9:
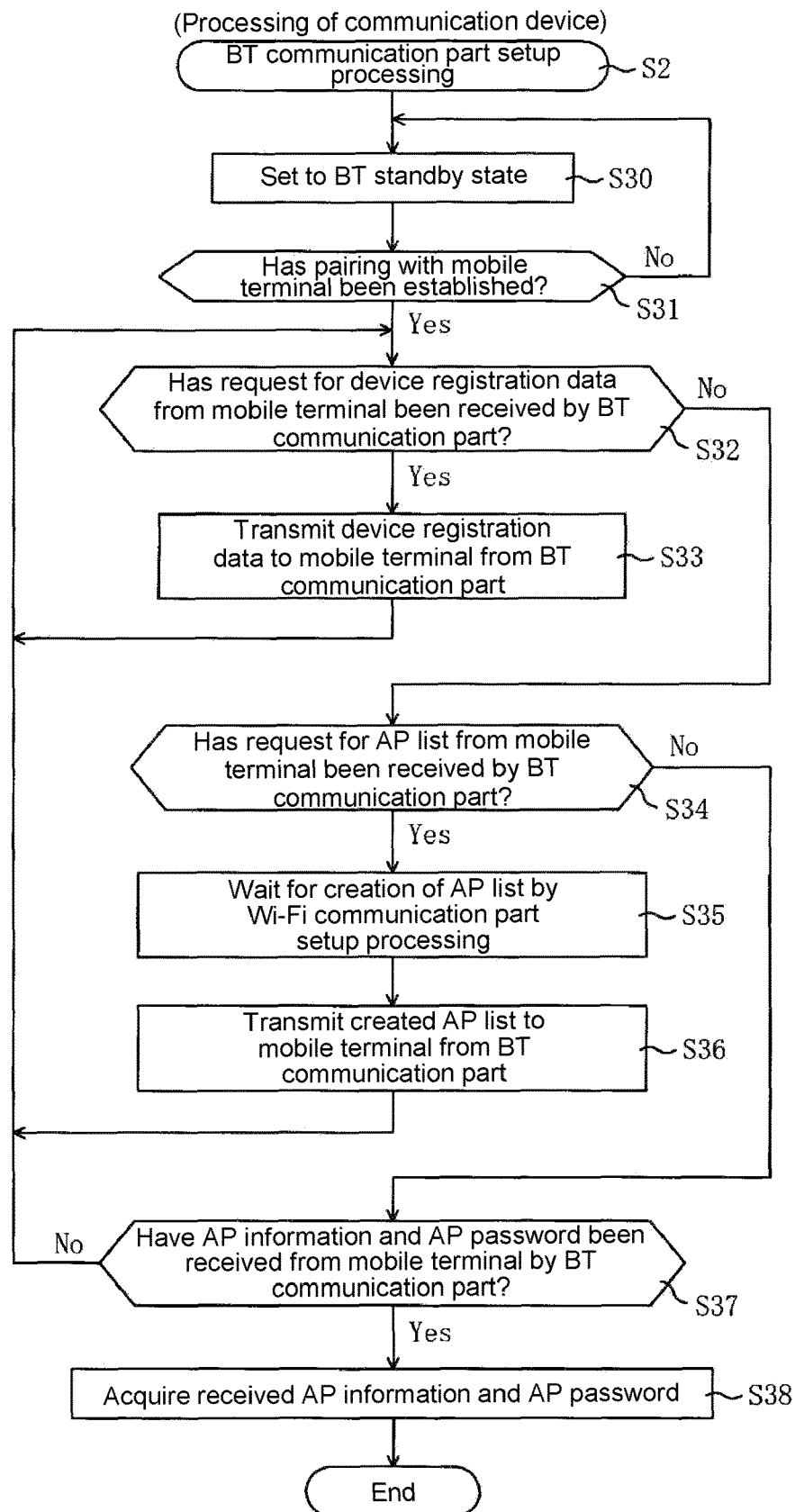
FIG. 9 is a flowchart of BT communication part setup processing.

First, processing of the setup mode of the communication device 1 is described. FIG. 9 is a flowchart of the BT communication part setup processing (S2). In the BT communication part setup processing, first, the BT communication part 5 is set to a standby state (S30). After the processing of S30, it is confirmed whether pairing with the mobile terminal 50 has been established (S31). In the processing of S31, if the pairing has not been established (S31: No), the processing of S30 onwards is repeated.

In the processing of S31, if the pairing with the mobile terminal 50 has been established (S31: Yes), it is confirmed whether a request for the device registration data from the mobile terminal 50 has been received by the BT communication part 5 (S32). In the processing of S32, if the request for the device registration data has been received (S32: Yes), the device registration data of the communication device 1, that is, the device identifier of the device identifier 11b and the product information of the product information 11c, are transmitted to the mobile terminal 50 by the BT communication part 5 (S33). After the processing of S33, the processing of S32 onwards is repeated.

In the processing of S32, if no request for the device registration data has been received (S32: No), it is confirmed whether a request for the list of APs 90 has been received from the mobile terminal 50 by the BT communication part 5 (S34). In the processing of S34, if the request for the list of APs 90 has been received (S34: Yes), standby is performed until the list of APs 90 is created by the processing of S51 of the Wi-Fi communication part setup processing (see FIG. 11) to be described later (S35). After the processing of S35, the created list of APs 90 is transmitted to the mobile terminal 50 from the BT communication part 5 (S36). After the processing of S36, the processing of S32 onwards is repeated.

In the processing of S34, if no request for the list of APs 90 has been received (S34: No), it is confirmed whether the information (AP information) about the AP 90 selected by the user H and the input PSW (AP password) of the AP 90 have been received from the mobile terminal 50 (S37). In the processing of S37, if the information about the AP 90 and the input PSW have been received (S37: Yes), the received information about the AP 90 and the received input PSW are acquired (S38).

The information about the AP 90 and the input PSW acquired by the processing of S38 are respectively stored in the AP information 11d and the AP password 11e. For the connection to the AP 90 after the setup mode, the information about the AP 90 and the input PSW stored in the AP information 11d and the AP password 11e are used.

In the processing of S37, if the information about the AP 90 and the input PSW have not been received (S37: No), the processing of S32 onwards is repeated. After the processing of S38, the BT communication part setup processing is ended. The end of the BT communication part setup processing after the processing of S38 may be on standby until the connection of the Wi-Fi communication part 4 to the AP 90 succeeds in the processings of S54 and S55 to be described later.

After the processing of S38, the communication device 1 may notify the electronic musical instrument 30 that the information about the AP 90 and the input PSW have been acquired. Upon receiving the notification, the electronic musical instrument 30 may restart the communication device 1. The restarted communication device 1 may connect to the AP 90 based on the information about the AP 90 and the input PSW stored in the AP information 11d and the AP password 11e, and may execute the processing after the setup mode.

Figure 10:
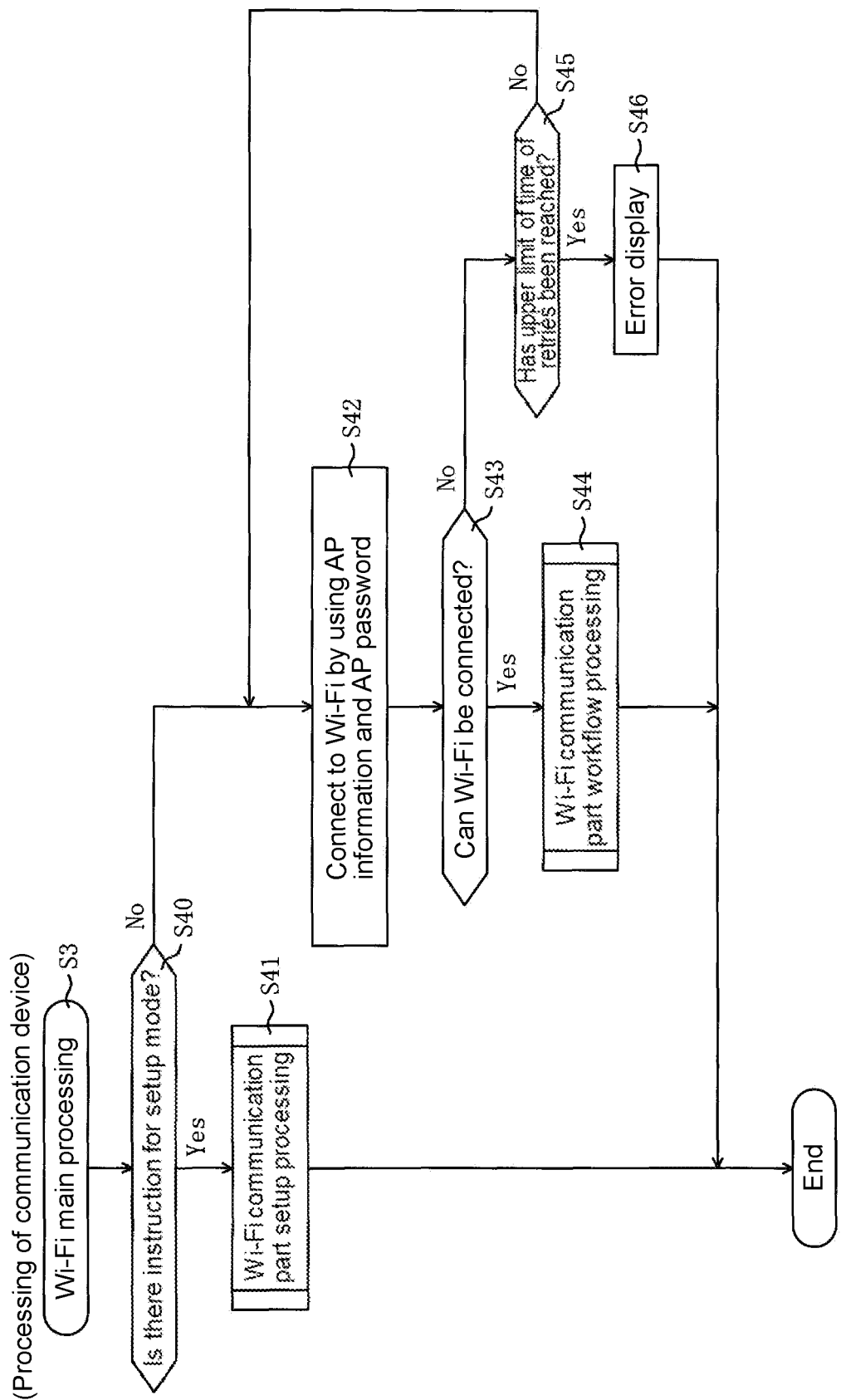
FIG. 10 is a flowchart of Wi-Fi main processing.

FIG. 10 is a flowchart of the Wi-Fi main processing (S3). In the Wi-Fi main processing, first, it is confirmed whether the operation button 2 of the communication device 1 has been pressed and held and there is an instruction for the setup mode (S40). In the processing of S40, if there is an instruction for the setup mode (S40: Yes), the Wi-Fi communication part setup processing (S41) is executed. Here, the Wi-Fi communication part setup processing is described with reference to FIG. 11.

Figure 11:
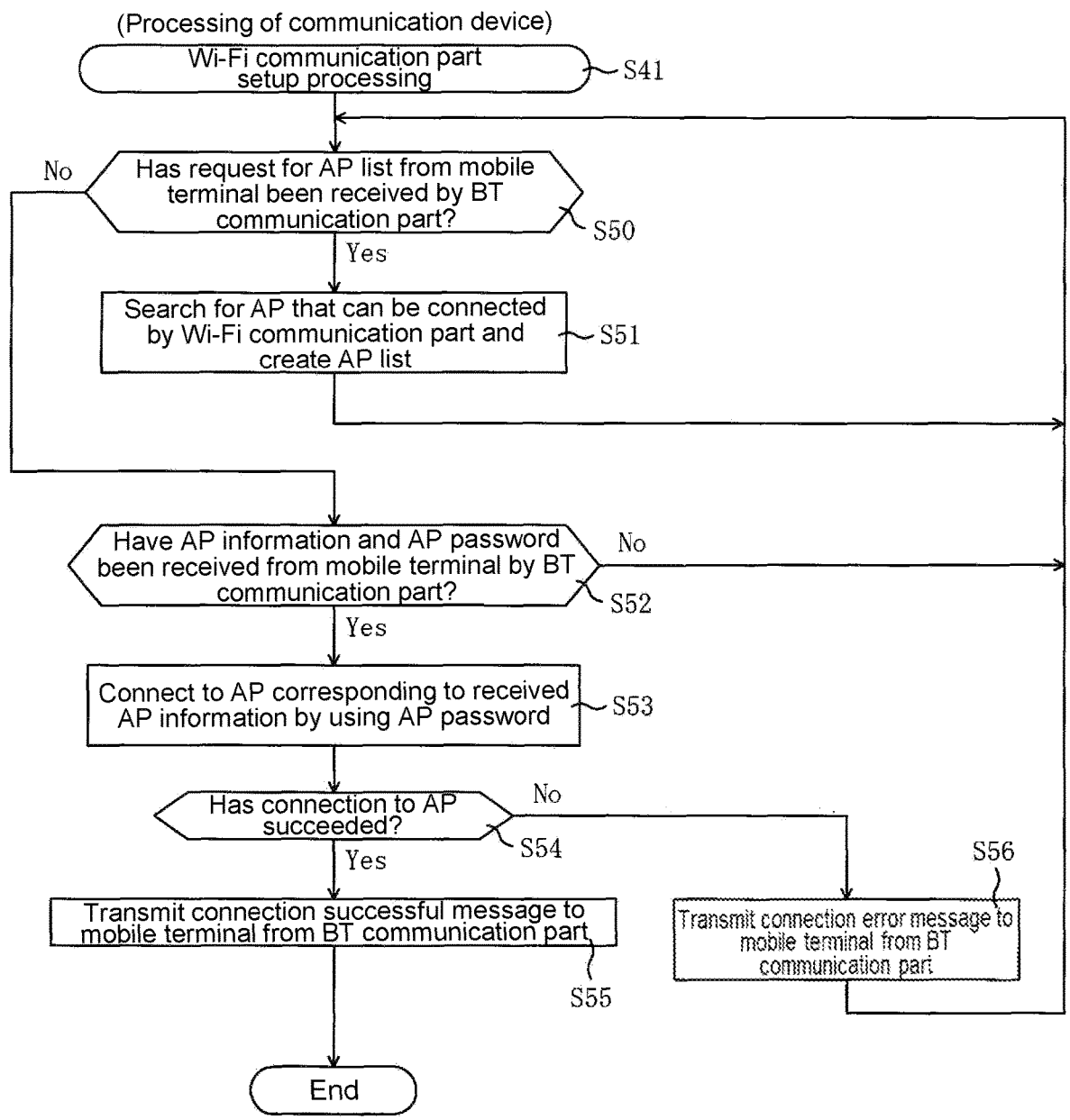
FIG. 11 is a flowchart of Wi-Fi communication part setup processing.

FIG. 11 is a flowchart of the Wi-Fi communication part setup processing (S41). In the Wi-Fi communication part setup processing, first, it is confirmed whether the request for the list of APs 90 has been received from the mobile terminal 50 by the BT communication part 5 (S50). In the processing of S50, if the request for the list of APs 90 has been received (S50: Yes), a search is performed for the AP 90 that can be connected by the Wi-Fi communication part 4 and a list of the searched APs 90 is created (S51). After the processing of S51, the processing of S50 onwards is repeated.

In the processing of S50, if no request for the list of APs 90 has been received (S50: No), it is confirmed whether the information (AP information) about the AP 90 selected by the user H and the input PSW (AP password) of the AP 90 have been received from the mobile terminal 50 by the BT communication part 5 (S52). In the processing of S52, if the information about the AP 90 and the input PSW have been received (S52: Yes), the AP 90 corresponding to the received information about the AP 90 is connected by the Wi-Fi communication part 4 by using the received input PSW (S53). In the processing of S52, if the information about the AP 90 and the input PSW have not been received (S52: No), the processing of S50 onwards is repeated.

After the processing of S53, it is confirmed whether the connection to the AP 90 by the Wi-Fi communication part 4 has succeeded (S54). In the processing of S54, if the connection to the AP 90 has succeeded (S54: Yes), the fact ("connection successful") that the connection has succeeded is transmitted from the BT communication part 5 to the mobile terminal 50 (S55).

On the other hand, in the processing of S54, if the connection to the AP 90 has failed (S54: No), the fact (connection error) that the connection has failed is transmitted from the BT communication part 5 to the mobile terminal 50 (S56). After the processing of S56, the processing of S50 onwards is repeated. After the processing of S55, the Wi-Fi communication part setup processing is ended.

Next, processing of the setup mode of the mobile terminal 50 is described. FIG. 12 is a flowchart of the mobile terminal setup processing (S11). In the mobile terminal setup processing, first, it is confirmed whether user registration of the user H with the server 70 has been completed (S60). In the processing of S60, if the user registration of the user H with the server 70 has not been completed (S60: No), the user registration of the user H is performed by transmitting the account (that is, e-mail address) and password of the user H to the server 70 (S61). After the processing of S61, the processing of S60 onwards is repeated.

In the processing of S60, if the user registration of the user H with the server 70 has been completed (S60: Yes), login to the server 70 is performed by transmitting the account and password of the user H to the server 70 by communication using an HTTPS protocol (S62). After the processing of S62, it is confirmed whether a response to the login received from the server 70 by communication using an HTTPS protocol is "OK" (S63).

In the processing of S63, if the response to the login is not "OK" (S63: No), display (error display) indicating that the login has failed is performed on the LCD 56 (S64). After the processing of S64, the processing of S62 onwards is repeated.

In the processing of S63, if the response to the login is "OK" (S63: Yes), the HTTPS access authorization information is received from the server 70. Then, pairing with the communication device 1 is performed by searching for the communication device 1 by the BT communication part 60 (S65). After the processing of S65, it is confirmed whether pairing with the communication device 1 has been established (S66). In the processing of S66, if the pairing has not been established (S66: No), the processing of S65 onwards is repeated.

In the processing of S66, if the pairing has been established (S66: Yes), the device registration data is requested from the communication device 1 from the BT communication part 60 (S67). After the processing of S67, it is confirmed whether the device registration data has been received from the communication device 1 by the BT communication part 60 (S68). In the processing of S68, if the device registration data has not been received (S68: No), the processing of S68 is repeated.

In the processing of S68, if the device registration data has been received (S68: Yes), the received device registration data is transmitted to the server 70 from the base communication part 61 by communication using an HTTPS protocol (S69). At this time, the HTTPS access authorization information received by the processing of S63 is included in the transmission.

After the processing of S69, it is confirmed whether a response to the transmission of the device registration data received from the server 70 by communication using an HTTPS protocol is "OK" (S70). In the processing of S70, if the response to the transmission of the device registration data is not "OK" (S70: No), display (error display) indicating that the transmission has failed is performed on the LCD 56 (S71). After the processing of S71, the processing of S67 onwards is repeated. On the other hand, in the processing of S70, if the response to the transmission of the device registration data is "OK" (S70: Yes), a list of APs 90 is requested from the communication device 1 by the BT communication part 60 (S72).

After the processing of S72, it is confirmed whether the list of APs 90 has been received from the communication device 1 by the BT communication part 60 (S73). In the processing of S73, if the list of APs 90 has not been received (S73: No), the processing of S73 is repeated. On the other hand, in the processing of S73, if the list of APs 90 has been received (S73: Yes), the received list of APs 90 is displayed on the LCD 56 (S74).

After the processing of S74, it is confirmed whether the AP 90 on the list displayed on the LCD 56 has been selected (specified) via the touch panel 57 and the input PSW (AP password) thereof has been input (S75). In the processing of S75, if the AP 90 has not been selected and the input PSW has not been input (S75: No), the processing of S75 is repeated. On the other hand, in the processing of S75, if the AP 90 has been selected and the input PSW has been input (S75: Yes), the information about the AP 90 and the input PSW are transmitted to the communication device 1 by the BT communication part 60 (S76).

After the processing of S76, it is confirmed whether a result of connection to the AP 90 has been received from the communication device 1 by the BT communication part 60 (S77). In the processing of S77, if the result of connection to the AP 90 has not been received (S77: No), the processing of S77 is repeated. On the other hand, in the processing of S77, if the result of connection to the AP 90 has been received (S77: Yes), it is confirmed whether the received result of connection is "connection successful" (S78).

In the processing of S78, if the received result of connection is "connection error" (S78: No), display (error display) indicating that the connection has failed is performed on the LCD 56 (S79), and the processing of S74 onwards is repeated. On the other hand, in the processing of S78, if the received result of connection is "connection successful" (S78: Yes), the mobile terminal setup processing is ended.

Next, processing of the setup mode of the server 70 is described. FIG. 13 is a flowchart of the server setup processing (S20). In the server setup processing, first, standby is performed until communication using an HTTPS protocol occurs (S80). After the processing of S80, it is confirmed whether user registration has been requested from the mobile terminal 50 by communication using an HTTPS protocol (S81).

In the processing of S81, if the user registration has been requested (S81: Yes), it is confirmed whether the account received from the mobile terminal 50 is not registered in the user DB 72b (see FIG. 7B) (S82). In the processing of S82, if the account received from the mobile terminal 50 is not registered in the user DB 72b (S82: Yes), the account and password received from the mobile terminal 50 and a uniquely created user identifier are registered in the user DB 72b (S83). After the processing of S83, the fact ("OK") that the received account has been registered in the user DB 72b is transmitted to the mobile terminal 50 by communication using an HTTPS protocol (S84).

On the other hand, in the processing of S82, if the account received from the mobile terminal 50 has been registered in the user DB 72b (S82: No), the fact (ERROR) that the received account has already been registered in the user DB 72b is transmitted to the mobile terminal 50 by communication using an HTTPS protocol (S85). After the processings of S84 and S85, the processing of S80 onwards is repeated.

In the processing of S81, if no request for user registration has been made (S81: No), it is confirmed whether login has been requested from the mobile terminal 50 by communication using an HTTPS protocol (S86). In the processing of S86, if login has been requested (S86: Yes), login is executed, and it is confirmed whether the login has succeeded (S87). In the processing of S87, if the login has succeeded (S87: Yes), the HTTPS access authorization information of the logged-in user H is created (S88).

After the processing of S88, the created HTTPS access authorization information and the fact ("OK") that the login has succeeded are transmitted to the mobile terminal 50 by communication using an HTTPS protocol (S89).

On the other hand, in the processing of S87, if the login has failed (S87: No), the fact (ERROR) is transmitted by communication using an HTTPS protocol (S90). After the processings of S89 and S90, the processing of S80 onwards is repeated.

In the processing of S86, if it is not a login request (S86: No), it is confirmed whether the device registration data has been received from the mobile terminal 50 by communication using an HTTPS protocol (S91). In the processing of S91, if the device registration data has been received (S91: Yes), it is confirmed whether a device identifier in the received device registration data exists in the device DB 72c (S92).

In the processing of S92, if the device identifier in the received device registration data exists in the device DB 72c (S92: Yes), product information of the received device registration data and the user identifier of the logged-in user H acquired from the user DB 72b are stored in a region of the device identifier of the received device registration data in the device DB 72c (S93). After the processing of S93, the fact ("OK") that the received device registration data has been successfully registered in the device DB 72c is transmitted by communication using an HTTPS protocol (S94).

On the other hand, in the processing of S92, if the device identifier in the received device registration data does not exist in the device DB 72c (S92: No), the fact ("ERROR") that the device registration data is not that of a regular communication device 1 is transmitted by communication using an HTTPS protocol (S95). After the processings of S94 and S95, the server setup processing is ended.

Next, processing of the communication device 1, the mobile terminal 50 and the server 70 after the setup mode is described. First, processing of the communication device 1 after the setup mode is described with reference to FIG. 10 and FIG. 14.

In the processing of S40 of FIG. 10, if there is no instruction for the setup mode (S40: No), the AP 90 is connected by the Wi-Fi communication part 4 by using the information about the AP 90 and the input PSW acquired by the processing of FIG. 9 described above (S42). After the processing of S42, it is confirmed whether connection to the AP 90 can be established (S43).

In the processing of S43, if the AP 90 can be connected (S43: Yes), Wi-Fi communication part workflow processing (S44) is performed. Details of the Wi-Fi communication part workflow processing will be described later.

On the other hand, if the AP 90 cannot be connected (S43: No), it is confirmed whether the number of attempts to connect to the AP 90 has reached an upper limit of the number (for example, 10 times) of retries (S45). In the processing of S45, if the number of attempts to connect to the AP 90 has not reached the upper limit of the number of retries (S45: No), the processing of S42 onwards is repeated; if the upper limit of the number of retries has been reached (S45: Yes), an error is displayed by blinking the LED 3 (S46). After the processings of S41, S44 and S46, the Wi-Fi main processing is ended.

Here, the Wi-Fi communication part workflow processing of S44 is described with reference to FIG. 14. FIG. 14 is a flowchart of the Wi-Fi communication part workflow processing. In the Wi-Fi communication part workflow processing (S44), first, the server 70 is connected in order to perform communication using an MQTT protocol (S100).

After the processing of S100, it is confirmed whether the server 70 can be connected by the processing of S100 (S101). In the processing of S101, if the server 70 cannot be connected (S101: No), the processing of S100 onwards is repeated.

On the other hand, in the processing of S101, if the server 70 can be connected (S101: Yes), a request topic of authorization information (that is, the user identifier and the HTTPS access authorization information) is transmitted to the server 70 by the Wi-Fi communication part 4 by using MQTT protocol communication (S102). Such a request topic includes the device identifier of the communication device 1. The processings of S100 and S102 are not necessarily executed according to a judgment made by the communication device 1. For example, in the case where the electronic musical instrument 30 recognizes that the communication device 1 is connected to the server 70, the processings of S100 and S102 may be executed by giving instructions to the communication device 1 from the electronic musical instrument 30.

After the processing of S102, it is confirmed whether the user identifier and the HTTPS access authorization information have been received from the server 70 by the Wi-Fi communication part 4 by communication using an MQTT protocol (S103). In the processing of S103, if the user identifier and the HTTPS access authorization information have not been received (S103: No), the processing of S103 is repeated.

On the other hand, in the processing of S103, if the user identifier and the HTTPS access authorization information have been received (S103: Yes), the received user identifier and HTTPS access authorization information are transmitted to the electronic musical instrument 30 via the external IF 15 (S104). Hereinafter, communication between the communication device 1 and the electronic musical instrument 30 in the Wi-Fi communication part workflow processing is assumed to be performed via the external IF 15.

The HTTPS access authorization information is not necessarily transmitted to the electronic musical instrument 30, and may, for example, be stored in the communication device 1. At that time, if the HTTPS access authorization information is required for communication using an HTTPS protocol, the electronic musical instrument 30 may instruct the communication device 1 to add the HTTPS access authorization information to the transmission. By doing so, since the HTTPS access authorization information can be prevented from leaking from the external IFs 15 and 37, security in the communication between the electronic musical instrument 30 and the server 70 can be improved.

In the electronic musical instrument 30, an instruction for utilizing a resource such as timbre data is created to the server 70 by using the user identifier and the HTTPS access authorization information received from the communication device 1. Details thereof will be described with reference to FIG. 15 in the electronic musical instrument workflow processing to be described later.

After the processing of S104, subscription registration is performed with respect to the server 70 by the user identifier received by the processing of S103 and the device identifier of the device identifier 11*b* (S105). From this point on, the communication device 1 becomes able to receive MQTT data including the topic "topic/{user identifier}/{device identifier}/#".

By transmitting the MQTT data including the topic from the mobile terminal 50 to the server 70, the communication device 1 receives the MQTT data from the server 70. A result obtained by receiving the MQTT data from the communication device 1 or the mobile terminal 50 and processing the same by the server 70 is transmitted to the communication device 1 as the MQTT data including the topic. In this way, the communication device 1 becomes able to exchange commands or data with the server 70 or with the mobile terminal 50 via the server 70.

After the processing of S105, various events in the communication device 1 are confirmed (S106). In the processing of S106, if the MQTT data, that is, a topic from the server 70 and a payload transmitted together with the topic, are received from the server 70 (S106: receive MQTT data from server), the MQTT data is transmitted to the electronic musical instrument 30 via the external IF 15 (S107). Here, the MQTT data refers to a topic and a payload transmitted together with the topic. This payload includes information accompanying instructions to the electronic musical instrument 30 or the server 70, a resource such as timbre data requested from the server 70, a result of processing by the server 70, or the like.

In the processing of S106, if the MQTT data is received from the electronic musical instrument 30 (S106: receive MQTT data from electronic musical instrument), the MQTT data is transmitted to the server 70 by communication using MQTT (S108).

In the processing of S106, if an HTTPS request is received from the electronic musical instrument 30 (S106: receive HTTPS request from electronic musical instrument), the HTTPS request is transmitted to the server 70 by communication using an HTTPS protocol (S109).

In the processing of S106, if an HTTPS response is received from the server 70 (S106: receive HTTPS response from server), the HTTPS response is transmitted to the electronic musical instrument 30 (S110). On the other hand, if no event has been received in the processing of S106 (S106: "no event"), or, after the processings of S107 to S110, the processing of S106 onwards is repeated.

Next, the electronic musical instrument workflow processing is described with reference to FIG. 15. FIG. 15 is a flowchart of the electronic musical instrument workflow processing. The electronic musical instrument workflow processing is processing executed after power of the electronic musical instrument 30 is turned on.

In the electronic musical instrument workflow processing, first, it is confirmed whether the user identifier and the HTTPS access authorization information have been received from the communication device 1 via the external IF 37 (S130). Hereinafter, communication between the electronic musical instrument 30 and the communication device 1 in the electronic musical instrument workflow processing is assumed to be performed via the external IF 37.

In the processing of S130, if the user identifier and the HTTPS access authorization information have been received (S130: Yes), the received user identifier and HTTPS access authorization information are acquired (S131). On the other hand, in the processing of S130, if the user identifier and the HTTPS access authorization information have not been received (S130: No), the processing of S131 is skipped.

After the processings of S130 and S131, various events of the electronic musical instrument 30 are confirmed (S132). In the processing of S132, if an instruction for the server 70 is input from the user H via the setting key 35 of the electronic musical instrument 30 (S132: "input instruction for server"), MQTT data or an HTTPS request according to the instruction is created and transmitted to the communication device 1 (S133). At this time, the user identifier and the HTTPS access authorization information are included in the transmission.

In the processing of S132, if the MQTT data is received from the communication device 1 (S132: "receive MQTT data from communication device"), the received MQTT data is analyzed (S134), and processing according to the analyzed MQTT data is performed (S135). In the processing of S132, if an HTTPS response is received from the communication device 1 (S132: "receive HTTPS response from communication device"), processing according to the received HTTPS response is performed (S136).

As the processings of S133 to S136, for example, in the mobile terminal 50, a list of available timbre data is acquired from the server 70 by communication using an MQTT protocol. The list of timbre data is displayed on the LCD 56 of the mobile terminal 50, and the user H is caused to make a selection via the touch panel 57. Information specifying the timbre data selected by the user H is transmitted to the server 70. The information specifying the timbre data is received by the electronic musical instrument 30 via the communication device 1, and the timbre data specified by the information is requested from the server 70 by communication using an HTTPS protocol. The timbre data received from the server 70 by communication using an HTTPS protocol based on the request is utilized by the electronic musical instrument 30.

If no event has been received in the processing of S132 (S132: "no event"), or, after the processings of S133, S135 and S136, the processing of S132 onwards is repeated.

Figure 16:
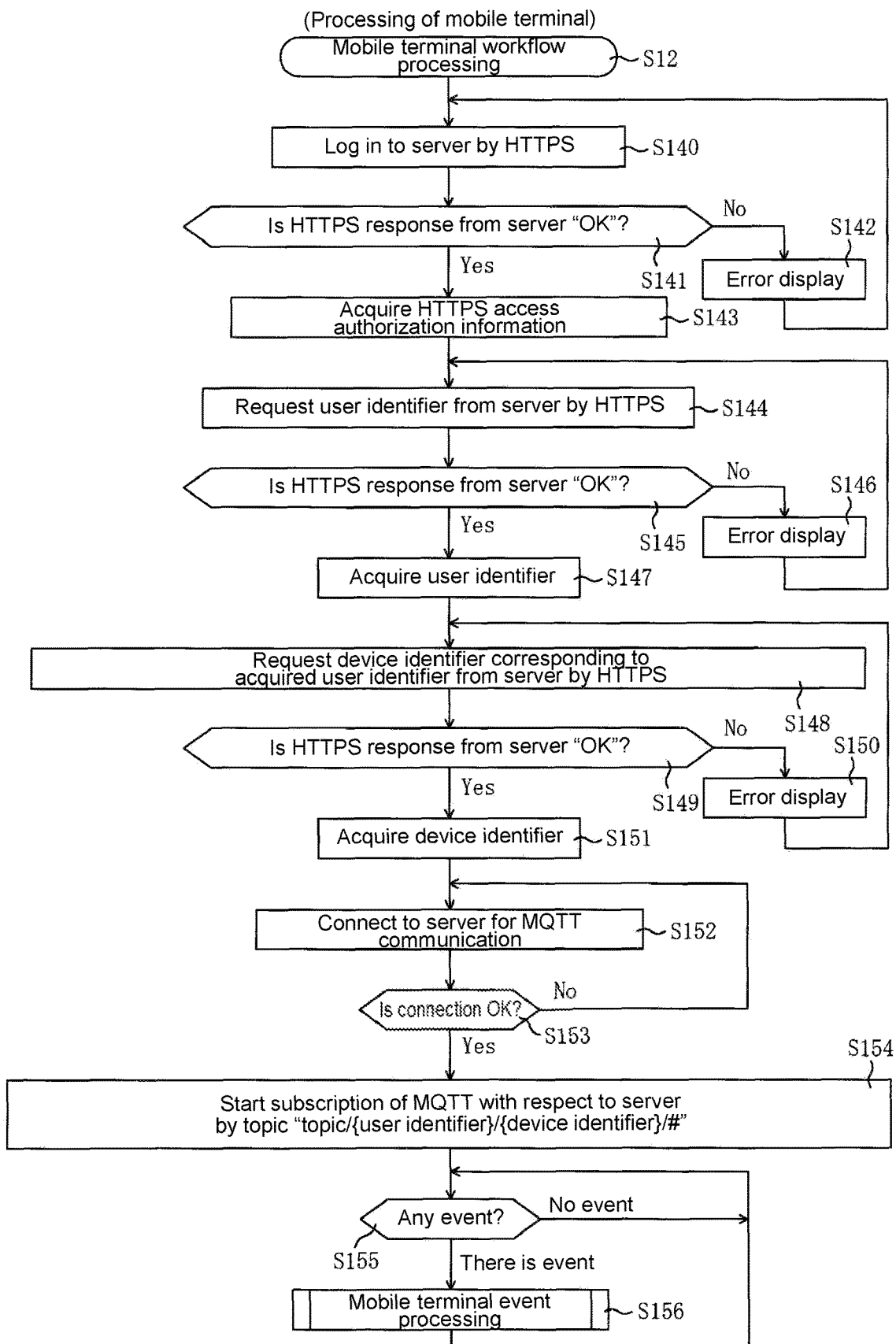
FIG. 16 is a flowchart of mobile terminal workflow processing.

Next, processing of the mobile terminal 50 after the setup mode is described with reference to FIG. 16. FIG. 16 is a flowchart of the mobile terminal workflow processing (S12). In the mobile terminal workflow processing, first, the user H logs in to the server 70 by communication using an HTTPS protocol (S140).

After the processing of S140, it is confirmed whether a response to the login received from the server 70 by communication using an HTTPS protocol is "OK" (S141). In the processing of S141, if the response to the login is not "OK" (S141: No), display (error display) indicating that the login has failed is performed on the LCD 56 (S142). After the processing of S142, the processing of S140 onwards is repeated.

On the other hand, in the processing of S141, if the response to the login is "OK" (S141: Yes), the HTTPS access authorization information received from the server 70 is acquired together with the response to the login (S143). The acquired HTTPS access authorization information will be used in subsequent HTTPS protocol communication from the mobile terminal 50 to the server 70. After the processing of S143, the user identifier of the user H is requested from the server 70 by communication using an HTTPS protocol (S144). After the processing of S144, it is confirmed whether a response to the request for the user identifier is "OK" (S145).

In the processing of S145, if the response to the request for the user identifier is not "OK" (S145: No), display (error display) indicating that the request for the user identifier has failed is performed on the LCD 56 (S146). After the processing of S146, the processing of S144 onwards is repeated. In the processing of S145, if the response to the request for the user identifier is "OK" (S145: Yes), the user identifier is acquired from the server 70 (S147).

After the processing of S147, a device identifier corresponding to the acquired user identifier is requested from the server 70 by communication using an HTTPS protocol (S148). After the processing of S148, it is confirmed whether a response to the request for the device identifier is "OK" (S149). In the processing of S149, if the response to the request for the device identifier is not "OK" (S149: No), display (error display) indicating that the request for the device identifier has failed is performed on the LCD 56 (S150). After the processing of S150, the processing of S148 onwards is repeated. In the processing of S149, if the response to the request for the device identifier is "OK" (S149: Yes), the device identifier is acquired from the server 70 (S151).

After the processing of S151, the server 70 is connected in order to perform communication using an MQTT protocol (S152). After the processing of S152, it is confirmed whether the server 70 can be connected by the processing of S152 (S153). In the processing of S153, if the server 70 cannot be connected (S153: No), the processing of S152 onwards is repeated.

In the processing of S153, if the server 70 can be connected (S153: Yes), subscription registration is performed with respect to the server 70 by the user identifier received by the processing of S147 and the device identifier received by the processing of S151 (S154). From this point on, the mobile terminal 50 becomes able to receive MQTT data including the topic "topic/{user identifier}/{device identifier}/# (#: any command such as data request or data)".

By transmitting the MQTT data including the topic from the communication device 1 to the server 70, the mobile terminal 50 receives the MQTT data from the server 70. A result obtained by receiving the MQTT data from the communication device 1 or the mobile terminal 50 and processing the same by the server 70 is transmitted to the mobile terminal 50 as the MQTT data including the topic. In this way, the mobile terminal 50 becomes able to exchange commands or data with the server 70 or with the communication device 1 via the server 70.

After the processing of S154, various events of the mobile terminal 50 are confirmed (S155). In the processing of S155, if there is an event (S155: "there is event"), mobile terminal event processing (S156) is executed. Examples of the mobile terminal event processing include creating MQTT data or an HTTPS request according to an instruction input to the mobile terminal 50 and transmitting the same to the server 70, analyzing the MQTT data received by the mobile terminal 50 and performing processing according to the MQTT data, and performing processing according to an HTTPS response from the server 70, like the processings of S133 to S136 of FIG. 15 described above.

If there is no event in the processing of S155 (S155: "no event"), or, after the processing of S156, the processing of S155 onwards is repeated.

Figure 17:
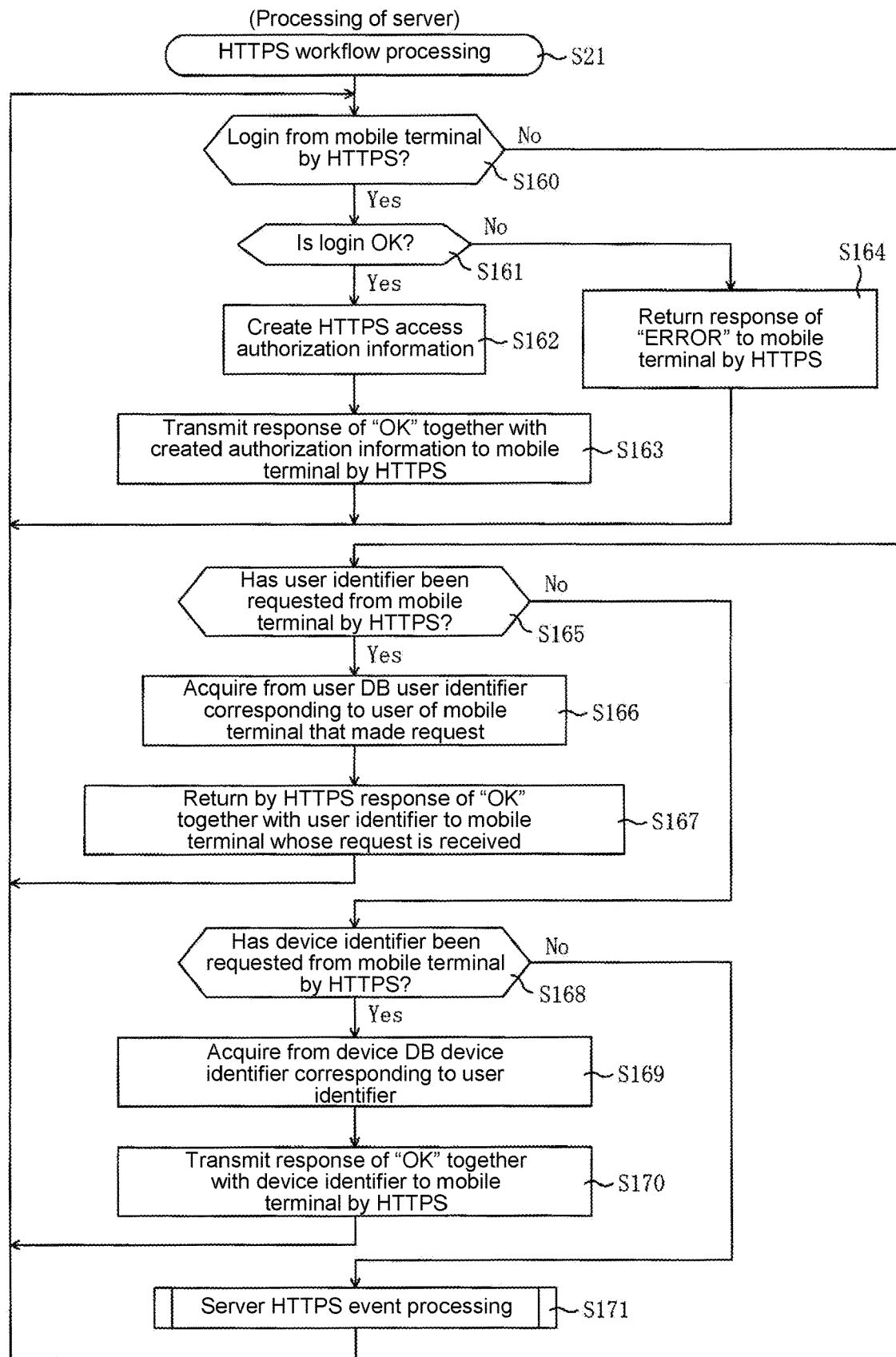
FIG. 17 is a flowchart of HTTPS workflow processing.

Next, processing of the server 70 after the setup mode is described with reference to FIG. 17 and FIG. 18. FIG. 17 is a flowchart of the HTTPS workflow processing (S21). In the HTTPS workflow processing, first, it is confirmed whether login has been requested from the mobile terminal 50 by communication using an HTTPS protocol (S160).

In the processing of S160, if login has been requested (S160: Yes), login is executed, and it is confirmed whether the login has succeeded (OK) (S161). In the processing of S161, if the login has succeeded (S161: Yes), the HTTPS access authorization information of the logged-in user H is created (S162). After the processing of S162, a response of "OK" to the login is transmitted together with the created HTTPS access authorization information to the mobile terminal 50 by communication using an HTTPS protocol (S163).

On the other hand, in the processing of S161, if the login has failed (S161: No), a response of "ERROR" to the login is transmitted to the mobile terminal 50 by communication using an HTTPS protocol (S164). After the processings of S163 and S164, the processing of S160 onwards is repeated.

In the processing of S160, if it is not a login request (S160: No), it is confirmed whether a request for user identifier has been made from the mobile terminal 50 by communication using an HTTPS protocol (S165). In the processing of S165, if a request for user identifier has been made (S165: Yes), a user identifier corresponding to the account of the user H of the mobile terminal 50 that made the request is acquired from the user DB 72*b* (S166). After the processing of S166, the acquired user identifier and a response of "OK" to the request for user identifier are transmitted to the mobile terminal 50 by communication using an HTTPS protocol (S167). After the processing of S167, the processing of S160 onwards is repeated.

In the processing of S165, if it is not a request for user identifier (S165: No), it is confirmed whether a request for device identifier has been made from the mobile terminal 50 by communication using an HTTPS protocol (S168). In the processing of S168, if a request for device identifier has been made (S168: Yes), a user identifier corresponding to the account of the user H of the mobile terminal 50 that made the request is acquired from the user DB 72*b*, and a device identifier corresponding to the user identifier is further acquired from the device DB 72*c* (S169).

After the processing of S169, the acquired device identifier and a response of "OK" to the request for device identifier are transmitted to the mobile terminal 50 by communication using an HTTPS protocol (S170). After the processing of S170, the processing of S160 onwards is repeated.

In the processing of S168, if it is not a request for device identifier (S168: No), server HTTPS event processing (S171) is executed, and the processing of S160 onwards is repeated. Examples of the server HTTPS event processing include processing in which an HTTPS request received from the communication device 1 or the mobile terminal 50 by communication using an HTTPS protocol is processed and a processing result is transmitted as an HTTPS response by communication using an HTTPS protocol. At this time, in the case where the HTTPS access authorization information included in the HTTPS request is valid, the HTTPS response is transmitted; in the case where the HTTPS access authorization information included in the HTTPS request is invalid, transmission of the HTTPS response may be omitted.

Figure 18:
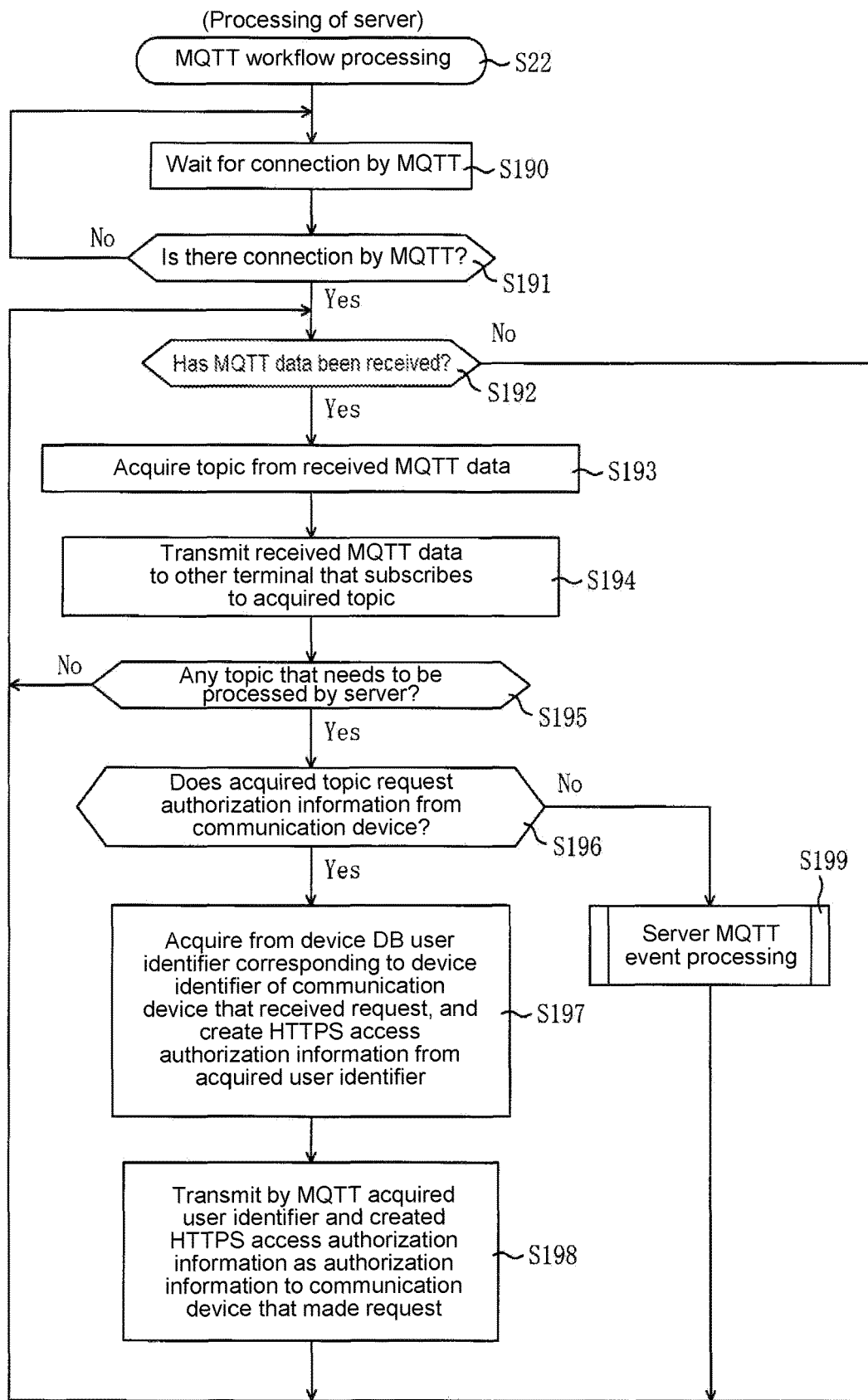
FIG. 18 is a flowchart of MQTT workflow processing.

FIG. 18 is a flowchart of the MQTT workflow processing (S22). In the MQTT workflow processing, first, standby is performed until communication connection using an MQTT protocol occurs (S190). After the processing of S190, it is confirmed whether a connection has been made by communication using an MQTT protocol (S191). In the processing of S191, if no connection has been made by communication using an MQTT protocol (S191: No), the processing of S190 onwards is repeated.

On the other hand, in the processing of S191, if a connection has been made by communication using an MQTT protocol (S191: Yes), it is further confirmed whether MQTT data has been received (S192).

In the processing of S192, if MQTT data has been received (S192: Yes), a topic of the received MQTT data is acquired (S193). After the processing of S193, the MQTT data received by the processing of S192 is transmitted to a terminal (that is, the communication device 1 or the mobile terminal 50) that subscribes to the acquired topic (S194).

Accordingly, since the MQTT data received from the communication device 1 or the mobile terminal 50 is transmitted to the mobile terminal 50 or the communication device 1 used by the same user H, the MQTT data transmitted from the communication device 1 or the mobile terminal 50 can be utilized and managed by the respective terminals.

After the processing of S194, it is confirmed whether the topic acquired by the processing of S193 includes a command that needs to be processed by the server 70 (S195). In the processing of S195, if the acquired topic includes a command that needs to be processed by the server 70 (S195: Yes), it is confirmed whether the command of the topic relates to a request for authorization information (that is, user identifier and HTTPS access authorization information) from the communication device 1 (S196).

In the processing of S196, if it relates to a request for authorization information from the communication device 1 (S196: Yes), a user identifier corresponding to the device identifier of the communication device 1 that received the request is acquired from the device DB 72*c*, and the HTTPS access authorization information is created from the acquired user identifier (S197). After the processing of S197, the user identifier acquired and the HTTPS access authorization information created by the processing of S197 are transmitted to the communication device 1 that made the request by communication using an MQTT protocol (S198).

In the processings of S197 and S198, in the case where the user identifier corresponding to the device identifier of the communication device 1 that received the request is stored in the device DB 72*c*, the HTTPS access authorization information is created by the processing of S197, and the user identifier and the created HTTPS access authorization information are transmitted by the processing of S198. On the other hand, in the case where the user identifier corresponding to the device identifier of the communication device 1 that received the request is not stored in the device DB 72*c*, creation of HTTPS access authorization information by the processing of S197 and transmission by the processing of S198 may be skipped.

On the other hand, in the processing of S196, if it does not relate to a request for authorization information from the communication device 1 (S196: No), server MQTT event processing (S199) is executed. Examples of the server MQTT event processing include changing a processing result by the server 70 obtained by processing requested from the communication device 1 or the mobile terminal 50 by using MQTT data into MQTT data, and transmitting the same.

If no MQTT data has been received (S192: No) and a command that needs to be processed by the server 70 is not included in the processing of S195 (S195: No), or, after the processings of S198 and S199, the processing of S192 onwards is repeated.

Although the disclosure has been described based on the above embodiments, it can be easily inferred that various improvements or modifications may be made.

In the above embodiments, the communication device 1 is configured to be mounted on the electronic musical instrument 30. However, the disclosure is not limited thereto. The communication device 1 may be built in the electronic musical instrument 30, and the processing concerning the communication device 1 may be executed by the electronic musical instrument 30. In this case, the device identifier is set as an identifier uniquely set for each electronic musical instrument 30, and the device identifier or product information (that is, device registration data) concerning the electronic musical instrument 30 may be stored.

In the above embodiments, the communication device 1 is provided with the AP information 11*d* and the AP password 11*e*, and the AP 90 is connected by using the information about the AP 90 and the input PSW stored in the AP information 11*d* and the AP password 11*e*. However, the disclosure is not limited thereto. For example, the information about the AP 90 and the input PSW received from the mobile terminal 50 may be transmitted to the electronic musical instrument 30 via the external IF 15 and be stored in the flash ROM 32 or the like of the electronic musical instrument 30. When the communication device 1 is connected to the AP 90, the information about the AP 90 and the input PSW stored in the electronic musical instrument 30 may be acquired from the electronic musical instrument 30, and the AP 90 may be connected by using the acquired information about the AP 90 and input PSW.

In the above embodiments, the communication device 1 is provided with the operation button 2 and the LED 3, and by pressing and holding the operation button 2, the communication device 1 is caused to shift to the setup mode, and the LED 3 is caused to blink at this time. However, the disclosure is not limited thereto. For example, by a predetermined operation of the setting key 35 of the electronic musical instrument 30, the communication device 1 may be caused to shift to the setup mode, and the LCD 36 may display that the communication device 1 is in the setup mode. In this case, the operation button 2 and the LED 3 may be omitted from the communication device 1.

In the above embodiments, the server 70 creates the HTTPS access authorization information based on the user identifier of the user H and transmits the same to the communication device 1 and/or the mobile terminal 50, and receives a resource from the communication device 1 and/or the mobile terminal 50 by communication using an HTTPS protocol based on the HTTPS access authorization information. However, the authorization information created by the server 70 is not limited to the HTTPS access authorization information. The server 70 may create authorization information in other communication protocols and transmit the same to the communication device 1 and/or the mobile terminal 50, and the communication device 1 and/or the mobile terminal 50 may receive a resource from the server 70 by using the authorization information transmitted from the server 70.

In the above embodiments, the AP 90 to be connected by Wi-Fi by the communication device 1 is selected by the user H by the mobile terminal 50, and the input PSW is input by the user H by the mobile terminal 50. However, the disclosure is not limited thereto. For example, in the case where the AP 90 that can be connected by the mobile terminal 50 is selected by the user H from the list of the APs 90 received from the communication device 1, input of the input PSW by the user H by the mobile terminal 50 may be omitted, and a password used by the mobile terminal 50 for connecting the AP 90 may be transmitted as the input PSW to the communication device 1. Further, in the case where the AP 90 that can be connected by the mobile terminal 50 is included in the list of APs 90 received from the communication device 1, selection of the AP 90 by the user H by the mobile terminal 50 may be omitted, the AP 90 that can be connected by the mobile terminal 50 may be automatically selected, and the information about the AP 90 concerning the AP 90 that can be connected by the mobile terminal 50 and a password used for connecting the AP 90 may be transmitted to the communication device 1.

In the above embodiments, the communication system S is composed of the electronic musical instrument 30 to which the communication device 1 is connected, the mobile terminal 50, and the server 70. However, the disclosure is not limited thereto. The mobile terminal 50 may be equipped with the function of the server 70, and the server 70 may be omitted from the communication system S. In contrast, the server 70 may be equipped with the function of the mobile terminal 50, and the mobile terminal 50 may be omitted from the communication system S.

In the above embodiments, by connecting the communication device 1 to the AP 90 by Wi-Fi, and by connecting the AP 90 to the Internet N, the communication device 1 communicates with the server 70 via the Internet N. However, the disclosure is not limited thereto. For example, the communication device 1 may be connected to the base station 100 and be connected to the Internet N via the base station 100 in the same manner as the mobile terminal 50. In this case, the base station 100 to which the communication device 1 is connected and the base station 100 to which the mobile terminal 50 is connected do not have to be the same base station. The communication device 1 may be connected to the AP 90 by a wireless communication standard other than Wi-Fi, or the communication device 1 and the Internet N may be connected by wired communication.

By connecting the mobile terminal 50 to the base station 100 and connecting the base station 100 to the Internet N, the mobile terminal 50 communicates with the server 70 via the Internet N. However, the disclosure is not limited thereto. For example, the mobile terminal 50 may be connected to the AP 90 by Wi-Fi and may be connected to the Internet N via the AP 90. In this case, the AP 90 to which the communication device 1 is connected and the AP 90 to which the mobile terminal 50 is connected do not have to be the same access point. The mobile terminal 50 and the Internet N may be connected by wired communication.

In the above embodiments, the communication device 1 and the mobile terminal 50 communicate with each other by Bluetooth. However, the disclosure is not limited thereto. For example, the communication device 1 and the mobile terminal 50 may be communicated by other short-range wireless communication standards such as ZigBee, or the communication device 1 and the mobile terminal 50 may be connected by wire for communication.

In the above embodiments, a terminal (information processing device) to which an instruction is input from the user H is exemplified by the mobile terminal 50. However, the disclosure is not limited thereto. For example, examples may include a terminal to which an instruction is input from the user H, such as a personal computer or a tablet terminal.

In the above embodiments, an electronic device to which the communication device 1 is connected is exemplified by the electronic musical instrument 30. However, the disclosure is not limited thereto. An electronic device to which the communication device 1 is connected may be a video device for processing a video. At this time, as a resource, video data or audio data, and data concerning editing such as scene switching may be stored on the server 70, and data according to an instruction from the video device may be transmitted to the communication device 1.

Furthermore, besides the above embodiments, the disclosure also includes the following embodiments.

(1-1) A communication device for connection to an electronic device, the communication device comprising:
- first communication connection electronics for communication connection with a server through a network access port;
- second communication connection electronics for communication connection with the electronic device when the communication device is connected to the electronic device; and
- processing electronics for controlling the communication device to:
  - transmit to the server, via the first communication connection electronics, a request for authorization information, the authorization information for accessing one or more data resources available from the server;
  - receive the authorization information, via the first communication connection electronics after transmitting the request;
  - receive a request for data via the second communication connection electronics, the request for data being associated with the one or more data resources; and
  - transmit to the server, via the first communication connection electronics, a data request corresponding to the request for data received by the communication device by using the received authorization information.

(1-2) The communication device of (1-1), wherein the processing electronics further controls the communication device to receive, via the first communication connection electronics, data corresponding to the request for data, after transmitting the data request to the server.

(1-3) The communication device of (1-2), wherein the processing electronics further controls the communication device to transmit the received data to the electronic device via the second communication connection electronics.

(1-4) The communication device of (1-1), wherein the processing electronics controls the communication device to transmit, via the first communication connection electronics, the data request to the server in response to the communication device receiving the request for data.

(1-5) The communication device of (1-1), wherein the processing electronics controls the communication device to transmit, via the first communication connection electronics, the authorization information to the server in association with the transmitting of the data request to the server.

(1-6) The communication device of (1-1), wherein the authorization information comprises HTTPS access authorization information and wherein the processing electronics controls the communication device to transmit, via the first communication electronics, the HTTPS access authorization information to the server in association with the transmitting of the data request to the server.

(1-7) The communication device of (1-1), wherein the authorization information comprises HTTPS access authorization information for communication with the server using an HTTPS protocol.

(1-8) The communication device of (1-1), wherein the processing electronics controls the communication device to:
- transmit, via the first communication connection electronics, a device identifier corresponding to the communication device;
- receive, via the first communication connection electronics, a user identifier corresponding to the device identifier and the authorization information; and
- transmit, via the first communication connection electronics, the authorization information to the server in association with the transmitting of the data request to the server.

(1-9) The communication device of (1-8), wherein the authorization information comprises HTTPS access authorization information.

(1-10) The communication device of (1-1), wherein the processing electronics controls the communication device to transmit, via the first communication electronics, the request for authorization information to the server using an MQTT communication protocol, and to receive, via the first communication electronics, the authorization information using the MQTT communication protocol.

(1-11) The communication device of (1-1), wherein:
- the authorization information comprises HTTPS access authorization information for an HTTPS protocol; and
- the processing electronics controls the communication device to transmit, via the first communication electronics and the HTTPS protocol, the data request to the server.

(1-12) The communication device of (1-1), wherein:
- the authorization information comprises HTTPS access authorization information for an HTTPS protocol; and
- the processing electronics controls the communication device to transmit, via the first communication electronics and the HTTPS protocol, the data request to the server, and to receive, via the first communication electronics and the HTTPS protocol, data corresponding to the request for data after transmitting the data request.

(1-13) The communication device of (1-1), wherein the communication device is associated with a device identifier, and wherein the processing electronics further controls the communication device to transmit, via the first communication electronics, the device identifier to the server in association with transmitting the request for authorization information to the server.

(1-14) The communication device of (1-13), wherein the device identifier is associated with a user identifier and wherein the authorization information is based on the user identifier.

(1-15) The communication device of (1-14), wherein the requested data comprises a server resource that is associated with the user identifier as being available to a user having the user identifier.

(1-16) The communication device of (1-1), wherein the first communication electronics comprises wireless communication electronics for a wireless communication connection with the server through the network access port.

(1-17) The communication device of (1-1), wherein the first communication electronics comprises WIFI wireless communication electronics for WIFI wireless communication connection with the server through the network access port.

(1-18) The communication device of (1-1), wherein the second communication connection electronics includes a plug configured to be received in a receptacle of the electronic device, for connecting the communication device to the electronic device for communication via the second communication electronics.

(1-19) The communication device of (1-18), wherein the plug is a USB plug.

(1-20) The communication device of (1-1), wherein the second communication connection electronics includes a plug, and wherein the first communication electronics and the processing electronics are contained in a housing attached to a USB plug, such that the communication device forms a plug-in module for selectively plugging into a USB port of the electronic device to connect the communication device to the electronic device.

(1-21) The communication device of (1-1), wherein the first and second communication electronics and the processing electronics are built into the electronic device.

(1-22) A non-transitory computer-readable medium of a communication device that connects to an electronic device, the medium comprising computer-readable instructions such that, when executed, causes processing electronics of the communication device to control the communication device to:
transmit to the server, via first communication connection electronics, a request for authorization information, the authorization information for accessing one or more data resources available from the server;
receive the authorization information via the first communication connection electronics, after transmitting the request;
receive a request for data via second communication connection electronics, the request for data being associated with the one or more data resources; and
transmit to the server, via the first communication connection electronics, a data request corresponding to the request for data received by the communication device by using the received authorization information.

(1-23) The non-transitory computer-readable medium of (1-22), wherein the processing electronics further controls the communication device to receive, via the first communication connection electronics, data corresponding to the request for data, after transmitting the request for data.

(1-24) The non-transitory computer-readable medium of (1-23), wherein the processing electronics further controls the communication device to transmit, via the second communication electronics, the data to the electronic device, after the data is received by the communication device.

(1-25) A method of a making a communication device, the method comprising:
providing first communication connection electronics and for communication with a server;
providing second communication connection electronics for communication with an electronic device; and
configuring processing electronics to:
transmit to the server, via the first communication connection electronics, a request for authorization information, the authorization information for accessing one or more data resources available from the server;
receive the authorization information, via the first communication connection electronics after transmitting the request;
receive a request for data via second communication connection electronics, the request for data being associated with the one or more data resources; and
transmit to the server, via the first communication connection electronics, a data request corresponding to the request for data received by the communication device by using the received authorization information.

(1-26) The method of (1-25), further comprising configuring processing electronics to receive, via the first communication connection electronics, data corresponding to the request for data, after transmitting the request for data.

(1-27) The method of (1-26), further comprising configuring processing electronics to transmit, via the second communication connection electronics, the data to the electronic device, after the data is received by the communication device.

(2-1) A communication device for connection to an electronic device, the communication device comprising:
first communication connection electronics for communication connection with a server through a network access point (AP) device;
second communication connection electronics for communication connection with the electronic device when the communication device is connected to the electronic device;
third communication connection electronics for communication connection with a mobile device; and
processing electronics for controlling the communication device to:
receive, via the third communication connection electronics, an input corresponding to a selected AP device;
connect, via the first communication electronics, with the selected AP device for communication with the server;
receive, via the first communication connection electronics, data from the server after connecting with the server; and
transmit, via the second communication connection electronics, the received data to the electronic device when the communication device is connected to the electronic device.

(2-2) The communication device of (2-1), wherein, prior to receiving an input corresponding to the selected AP device, the processing electronics is configured to:
search for and identify one or more AP devices that can be connected via the first communication connection electronics for communication with the server; and
transmit, via the third communication connection electronics, AP information corresponding to the one or more identified AP devices;
wherein the input corresponding to the selected AP device comprises input corresponding to a selected one of the one or more identified AP devices.

(2-3) The communication device of (2-1), wherein the processing electronics is further configured to receive, via the third communication connection electronics, a password associated with the selected one of the one or more AP devices, and wherein the processing electronics is further configured to use the password to connect with the selected one of the one or more AP devices for communication with the server.

(2-4) The communication device of (2-1), wherein the processing electronics is further configured to:
receive, via the third communication connection electronics, a password associated with the selected one of the one or more AP devices;
store the AP information and the password in an electronic memory device; and
use the stored AP information and the stored password to connect, via the first communication connection electronics, with the selected one of the one or more AP devices for communication with the server.

(2-5) The communication device of (2-1), wherein the processing electronics is further configured to transmit, via the second communication connection electronics, a notification to the electronic device that the AP information has been acquired by the communication device.

(2-6) The communication device of (2-1), further comprising one or more electronic memory devices, and wherein the processing electronics is further configured to store the AP information in the one or more electronic memory devices.

(2-7) The communication device of (2-1), wherein the processing electronics is further configured to:
store the AP information in an electronic memory device; and
connect, via the first communication electronics, with the selected one of the one or more AP devices for communication with the server, using the stored AP information.

(2-8) The communication device of (2-1), wherein the processing electronics is further configured to receive, via the second communication connection electronics, device identification information and device product information from the electronic device, when the communication device is connected to the electronic device.

(2-9) The communication device of (2-1), wherein the first communication electronics comprises wireless communication electronics for a wireless communication connection with the server through the network access port.

(2-10) The communication device of (2-1), wherein the first communication electronics comprises WIFI wireless communication electronics for WIFI wireless communication connection with the server through the network access port.

(2-11) The communication device of (2-1), wherein the second communication connection electronics includes a plug configured to be received in a receptacle of the electronic device, for connecting the communication device to the electronic device for communication via the second communication electronics.

(2-12) The communication device of (2-11), wherein the plug is a USB plug.

(2-13) The communication device of (2-1), wherein the second communication connection electronics includes a plug, and wherein the first and third communication electronics and the processing electronics are contained in a housing attached to a USB plug, such that the communication device forms a plug-in module for selectively plugging into a USB port of the electronic device to connect the communication device to the electronic device.

(2-14) The communication device of (2-1), wherein the third communication electronics comprises wireless communication electronics for a wireless communication connection with the mobile device.

(2-15) The communication device of (2-1), wherein the third communication electronics comprises Bluetooth communication electronics for Bluetooth communication connection with the mobile device.

(2-16) The communication device of (2-1), wherein the first and second communication electronics and the processing electronics are built into the electronic device.

(2-17) A non-transitory computer-readable medium of a communication device that connects to an electronic device, the medium comprising computer-readable instructions such that, when executed, causes processing electronics of the communication device to control the communication device to:
receive, via third communication connection electronics, an input corresponding to a selected AP device;
connect, via first communication electronics, with the selected AP device for communication with the server;
receive, via the first communication connection electronics, data from the server after connecting with the server; and
transmit, via second communication connection electronics, the received data to the electronic device when the communication device is connected to the electronic device.

(2-18) The non-transitory computer-readable medium of (2-17), wherein the processing electronics is further configured to:
search for and identify one or more AP devices that can be connected via first communication connection electronics for communication with the server; and
transmit, via second communication connection electronics, AP information corresponding to the one or more identified AP devices;
wherein the input corresponding to the selected AP device comprises input corresponding to a selected one of the one or more identified AP devices.

(2-19) The non-transitory computer-readable medium of (2-17), wherein the processing electronics is further configured to receive, via the third communication connection electronics, a password associated with the selected one of the one or more AP devices, and wherein the processing electronics is further configured to use the password to connect with the selected one of the one or more AP devices for communication with the server.

(2-20) The non-transitory computer-readable medium of (2-17), wherein the processing electronics is further configured to:
receive, via the third communication connection electronics, a password associated with the selected one of the one or more AP devices;
store the AP information and the password in an electronic memory device; and
use the stored AP information and the stored password to connect, via the first communication connection electronics, with the selected one of the one or more AP devices for communication with the server.

(2-21) The non-transitory computer-readable medium of (2-17), wherein the processing electronics is further configured to transmit, via the second communication connection electronics, a notification to the electronic device that the AP information has been acquired by the communication device.

(2-22) The non-transitory computer-readable medium of (2-17), further comprising one or more electronic memory devices, and wherein the processing electronics is further configured to store the AP information in the one or more electronic memory devices.

(2-23) The non-transitory computer-readable medium of (2-17), wherein the processing electronics is further configured to:
store the AP information in an electronic memory device; and
connect, via the first communication electronics, with the selected one of the one or more AP devices for communication with the server, using the stored AP information.

(2-24) The non-transitory computer-readable medium of (2-17), wherein the processing electronics is further configured to receive, via the second communication connection electronics, device identification information and device product information from the electronic device, when the communication device is connected to the electronic device.

(2-25) The non-transitory computer-readable medium of (2-17), wherein the first communication electronics comprises wireless communication electronics for a wireless communication connection with the server through the network access port.

(2-26) The non-transitory computer-readable medium of (2-17), wherein the first communication electronics comprises WIFI wireless communication electronics for WIFI wireless communication connection with the server through the network access port.

(2-27) The non-transitory computer-readable medium of (2-17), wherein the second communication connection electronics includes a plug configured to be received in a receptacle of the electronic device, for connecting the communication device to the electronic device for communication via the second communication electronics.

(2-28) The non-transitory computer-readable medium of (2-27), wherein the plug is a USB plug.

(2-29) The non-transitory computer-readable medium of (2-17), wherein the second communication connection electronics includes a plug, and wherein the first and third communication electronics and the processing electronics are contained in a housing attached to a USB plug, such that the communication device forms a plug-in module for selectively plugging into a USB port of the electronic device to connect the communication device to the electronic device.

(2-30) The non-transitory computer-readable medium of (2-17), wherein the third communication electronics comprises wireless communication electronics for a wireless communication connection with the mobile device.

(2-31) The non-transitory computer-readable medium of (2-17), wherein the third communication electronics comprises Bluetooth communication electronics for Bluetooth communication connection with the mobile device.

(2-32) The non-transitory computer-readable medium of (2-17), wherein the first and second communication electronics and the processing electronics are built into the electronic device.

(2-33) A method of a making a communication device, the method comprising:
providing first communication connection electronics and for communication with a server;
providing second communication connection electronics for communication with an electronic device;
providing third communication connection electronics for communication with a mobile terminal; and
configuring processing electronics to:
receive, via third communication connection electronics, an input corresponding to a selected AP device;
connect, via the first communication electronics, with the selected AP device for communication with the server;
receive, via the first communication connection electronics, data from the server after connecting with the server; and
transmit, via the second communication connection electronics, the received data to the electronic device when the communication device is connected to the electronic device.

(2-34) The method of (2-33), wherein the processing electronics is further configured to:
search for and identify one or more AP devices that can be connected via first communication connection electronics for communication with the server; and
transmit, via second communication connection electronics, AP information corresponding to the one or more identified AP devices;

wherein the input corresponding to the selected AP device comprises input corresponding to a selected one of the one or more identified AP devices.

(3-1) A network server processing and communication system, comprising:
at least one non-transient data storage device storing data including a plurality of device identifiers in association with a plurality of user identifiers, where each device identifier is associated with a user identifier; and
at least one processor configured to:
receive a request for authorization information and at least one device identifier associated with at least one of a communication device and a mobile terminal;
acquire from the at least one non-transient data storage device, a user identifier corresponding to the received device identifier;
create authorization information from the acquired user identifier; and
transmit the acquired user identifier and the created authorization information to at least one of the communication device and the mobile terminal, with the received device identifier.

(3-2) The system of (3-1), wherein the request for authorization information and the device identifier are received via MQTT protocol.

(3-3) The system of (3-1), wherein the authorization information comprises HTTPS access authorization information for communication via HTTPS protocol.

(3-4) The system of (3-1), wherein the at least one processor is further configured to:
receive a request for data, the request for data being associated with the authorization information;
confirm that the authorization information associated with the request for data is valid; and
transmit the retrieved data to the mobile terminal upon confirming that the authorization information is valid.

(3-5) The system of (3-4), wherein the at least one processor is further configured to retrieve the requested data from the at least one non-transient data storage device.

(3-6) The system of (3-1), further comprising confirming that the acquired user identifier corresponds to a user account registered with the server, before creating or transmitting the authorization information.

(3-7) The system of (3-1), further comprising confirming that the request for authorization information corresponds to one or more resources that are available to a user associated with the acquired user identifier, before creating or transmitting the authorization information.

(3-8) A non-transitory computer-readable medium of a network server processing and communication system, the medium comprising computer-readable instructions such that, when executed, causes processing electronics of the network server processing and communication system to control the communication device to:
receive a request for authorization information and at least one device identifier associated with at least one of a communication device and a mobile terminal;
acquire from the at least one non-transient data storage device, a user identifier corresponding to the received device identifier;
create authorization information from the acquired user identifier; and
transmit the acquired user identifier and the created authorization information to at least one of the communication device and the mobile terminal, with the received device identifier.

(3-9) The system of (3-8), wherein the request for authorization information and the device identifier are received via MQTT protocol.

(3-10) The system of (3-8) wherein the authorization information comprises HTTPS access authorization information for communication via HTTPS protocol.

(3-11) The system of (3-8), wherein the processing electronics is further configured to:
receive a request for data, the request for data being associated with the authorization information;
confirm that the authorization information associated with the request for data is valid; and
transmit the retrieved data to the mobile terminal upon confirming that the authorization information is valid.

(3-12) The system of (3-11), wherein the processing electronics is further configured to retrieve the requested data from the at least one non-transient data storage device.

(3-13) The system of (3-8), wherein the processing electronics is further configured to confirm that the acquired user identifier corresponds to a user account registered with the server, before creating or transmitting the authorization information.

(3-14) The system of (3-8), wherein the processing electronics is further configured to confirm that the request for authorization information corresponds to one or more resources that are available to a user associated with the acquired user identifier, before creating or transmitting the authorization information.

(3-15) A method for a network server processing and communication system, the method comprising:
storing, in at least one non-transient data storage device, data including a plurality of device identifiers in association with a plurality of user identifiers, where each device identifier is associated with a user identifier; and
configuring at least one processor to:
receive, over a communication network, a request for authorization information and at least one device identifier associated with at least one of a communication device and a mobile terminal;
acquire from the at least one non-transient data storage device, a user identifier corresponding to the received device identifier;
create authorization information from the acquired user identifier; and
transmit, over the communication network, the acquired user identifier and the created authorization information to at least one of the communication device and the mobile terminal, with the received device identifier.

(3-16) The system of (3-15), wherein the request for authorization information and the device identifier are received via MQTT protocol.

(3-17) The system of (3-15), wherein the authorization information comprises HTTPS access authorization information for communication via HTTPS protocol.

(3-18) The system of (3-15) wherein the at least one processor is further configured to:
receive a request for data, the request for data being associated with the authorization information;
confirm that the authorization information associated with the request for data is valid; and
transmit the retrieved data to the mobile terminal upon confirming that the authorization information is valid.

(3-19) The system of (3-18), wherein the at least one processor is further configured to retrieve the requested data from the at least one non-transient data storage device.

(3-20) The system of (3-15), further comprising confirming that the acquired user identifier corresponds to a user account registered with the server, before creating or transmitting the authorization information.

What is claimed is:

1. A communication system, comprising:
a communication device;
an electronic musical instrument to which the communication device is connected; and
a server configured to be able to communicate with the communication device and storing data utilized by the electronic musical instrument, wherein
the communication device comprises:
an authorization information request part, transmitting to the server a request for authorization information for accessing the server together with a device identifier being an identifier set for each of the communication device;
an authorization information reception part, receiving from the server the authorization information according to the request transmitted by the authorization information request part;
a first data request information reception part, receiving from the electronic musical instrument data request information that requests predetermined data to the server;
a data request information transmission part, transmitting to the server the data request information received by the first data request information reception part by using the authorization information received by the authorization information reception part;
a data reception part, receiving from the server data according to the data request information transmitted by the data request information transmission part; and
a first data transmission part, transmitting to the electronic musical instrument the data received by the data reception part, and
the server comprises:
an identifier storage part, storing the device identifier in association with a user identifier being an identifier for each user who uses the communication device corresponding to the device identifier in response to the user logging in to the server and registering the device identifier with the server;
an authorization information request reception part, receiving from the communication device the request for the authorization information together with the device identifier of the communication device;
an authorization information creation part, acquiring from the identifier storage part the user identifier corresponding to the device identifier received by the authorization information request reception part, and creating the authorization information according to a user corresponding to the acquired user identifier;
a first authorization information transmission part, transmitting the authorization information created by the authorization information creation part to the communication device;
a second data request information reception part, receiving the data request information from the communication device; and
a second data transmission part, transmitting to the communication device the data according to the data request information received by the second data request information reception part.

2. The communication system according to claim 1, wherein
the communication device comprises a second authorization information transmission part transmitting to the electronic musical instrument the authorization information received by the authorization information reception part;

the first data request information reception part of the communication device is configured to receive from the electronic musical instrument the authorization information transmitted by the second authorization information transmission part together with the data request information;

the data request information transmission part of the communication device is configured to transmit to the server the data request information received by the first data request information reception part by using the authorization information received by the first data request information reception part.

3. The communication system according to claim 1, wherein the authorization information request part of the communication device is configured to transmit the device identifier to the server in response to establishment of communication with the server;

the authorization information reception part of the communication device is configured to receive from the server the authorization information based on the device identifier transmitted by the authorization information request part in response to establishment of communication with the server.

4. The communication system according to claim 1, wherein the authorization information request part of the communication device transmits the device identifier to the server by using MQTT protocol communication.

5. The communication system according to claim 1, wherein the authorization information reception part of the communication device receives the authorization information from the server by using MQTT protocol communication.

6. The communication system according to claim 1, wherein the authorization information is access authorization information for an HTTPS protocol;

the data request information transmission part of the communication device is configured to transmit the data request information to the server by HTTPS protocol communication by using the access authorization information for an HTTPS protocol comprised in the data request information received by the first data request information reception part;

the data reception part of the communication device is configured to receive, from the server by HTTPS protocol communication, the data according to the data request information transmitted by HTTPS protocol communication by the first data request information reception part.

7. The communication system according to claim 1, wherein the authorization information creation part of the server is configured to, in response to the user identifier corresponding to the device identifier received by the authorization information request reception part being stored in the identifier storage part, acquire the user identifier corresponding to the device identifier from the identifier storage part, and create the authorization information according to the user corresponding to the acquired user identifier.

8. The communication system according to claim 1, wherein the second data transmission part of the server is configured to, in response to the authorization information used when the data request information is received by the second data request information reception part being valid, transmit the data according to the data request information to the communication device.

9. The communication system according to claim 1, wherein the communication device is mounted on the electronic musical instrument.

10. The communication system according to claim 1, wherein the communication device is built in the electronic musical instrument.

11. The communication system according to claim 1, wherein the data on the server is timbre data used for sound production by the electronic musical instrument.

12. A communication device, connected to an electronic musical instrument and able to communicate with a server that stores data utilized by the electronic musical instrument, wherein the communication device comprises:

an authorization information request part, transmitting to the server a request for authorization information for accessing the server together with a device identifier being an identifier set for each of the communication device;

an authorization information reception part, receiving from the server the authorization information created according to a user corresponding to a user identifier which is corresponding to the device identifier received from the authorization information request part in response to the request transmitted by the authorization information request part, wherein the user identifier is an identifier for each user who uses the communication device corresponding to the device identifier and stored in association with the device identifier in response to the user logging in to the server and registering the device identifier with the server;

a first data request information reception part, receiving from the electronic musical instrument data request information that requests predetermined data to the server;

a data request information transmission part, transmitting to the server the data request information received by the first data request information reception part by using the authorization information received by the authorization information reception part;

a data reception part, receiving from the server data according to the data request information transmitted by the data request information transmission part; and a first data transmission part, transmitting to the electronic musical instrument the data received by the data reception part.

13. The communication device according to claim 12, wherein the communication device comprises a second authorization information transmission part transmitting to the electronic musical instrument the authorization information received by the authorization information reception part;

the first data request information reception part is configured to receive from the electronic musical instrument the authorization information transmitted by the second authorization information transmission part together with the data request information;

the data request information transmission part is configured to transmit to the server the data request information received by the first data request information reception part by using the authorization information received by the first data request information reception part.

14. The communication device according to claim 12, wherein
the authorization information request part is configured to transmit the device identifier to the server in response to establishment of communication with the server;
the authorization information reception part is configured to receive from the server the authorization information based on the device identifier transmitted by the authorization information request part in response to establishment of communication with the server.

15. The communication device according to claim 12, wherein
the authorization information request part transmits the device identifier to the server by using MQTT protocol communication;
the authorization information reception part receives the authorization information from the server by using MQTT protocol communication.

16. The communication device according to claim 12, wherein
the authorization information is access authorization information for an HTTPS protocol;
the data request information transmission part is configured to transmit the data request information to the server by HTTPS protocol communication by using the access authorization information for an HTTPS protocol comprised in the data request information received by the first data request information reception part;
the data reception part is configured to receive, from the server by HTTPS protocol communication, the data according to the data request information transmitted by HTTPS protocol communication by the first data request information reception part.

17. A server configured to be able to communicate with a communication device, comprising:
an identifier storage part, storing a device identifier being an identifier set for each of the communication device in association with a user identifier being an identifier for each user who uses the communication device corresponding to the device identifier in response to the user logging in to the server and registering the device identifier with the server;
an authorization information request reception part, receiving from the communication device a request for authorization information together with the device identifier of the communication device;
an authorization information creation part, acquiring from the identifier storage part the user identifier corresponding to the device identifier received by the authorization information request reception part, and creating the authorization information according to a user corresponding to the acquired user identifier;

a first authorization information transmission part, transmitting the authorization information created by the authorization information creation part to the communication device;
a second data request information reception part, receiving from the communication device data request information that requests predetermined data; and
a second data transmission part, transmitting to the communication device data according to the data request information received by the second data request information reception part.

18. The server according to claim 17, wherein
the authorization information creation part is configured to, in response to the user identifier corresponding to the device identifier received by the authorization information request reception part being stored in the identifier storage part, acquire the user identifier corresponding to the device identifier from the identifier storage part, and create the authorization information according to the user corresponding to the acquired user identifier.

19. The server according to claim 17, wherein
the second data transmission part is configured to, in response to the authorization information used when the data request information is received by the second data request information reception part being valid, transmit the data according to the data request information to the communication device.

20. An access method for accessing data stored on a server from an electronic musical instrument connected to the server, comprising:
storing on the server a device identifier being an identifier set for each of the electronic musical instrument in association with a user identifier being an identifier for each user who uses the electronic musical instrument corresponding to the device identifier in response to the user logging in to the server and registering the device identifier with the server;
communicably connecting the electronic musical instrument and the server with each other;
in the electronic musical instrument, transmitting a request for authorization information for accessing the server to the server together with the device identifier;
in the server, acquiring from the stored user identifier the user identifier corresponding to the device identifier received from the electronic musical instrument together with the request for the authorization information, and creating the authorization information according to a user corresponding to the acquired user identifier;
transmitting the created authorization information to the electronic musical instrument;
in the electronic musical instrument, transmitting data request information that requests predetermined data from the server to the server by using the authorization information requested and received from the server;
in the server, transmitting data according to the data request information received from the electronic musical instrument to the electronic musical instrument; and
in the electronic musical instrument, receiving from the server the data according to the transmitted data request information.

* * * * *